(12) United States Patent
Bernaudin et al.

(10) Patent No.: US 10,565,556 B2
(45) Date of Patent: Feb. 18, 2020

(54) MANAGER COCKPIT FOR IMPROVING MANAGER PERFORMANCE

(71) Applicants: Ingrid Bernaudin, Palo Alto, CA (US); Michael Dandan, San Mateo, CA (US)

(72) Inventors: Ingrid Bernaudin, Palo Alto, CA (US); Michael Dandan, San Mateo, CA (US)

(73) Assignee: SuccessFactors, Inc., South San Francisco, CA (US)

(*) Notice: Subject to any disclaimer, the term of this patent is extended or adjusted under 35 U.S.C. 154(b) by 398 days.

(21) Appl. No.: 14/491,712

(22) Filed: Sep. 19, 2014

(65) Prior Publication Data

US 2015/0331556 A1 Nov. 19, 2015

Related U.S. Application Data

(60) Provisional application No. 61/996,829, filed on May 14, 2014.

(51) Int. Cl.
| | |
|---|---|
| *G06F 3/0482* | (2013.01) |
| *G06Q 10/10* | (2012.01) |
| *G06F 9/54* | (2006.01) |
| *G06F 3/0484* | (2013.01) |
| *G06Q 10/06* | (2012.01) |

(52) U.S. Cl.
CPC .......... *G06Q 10/10* (2013.01); *G06F 3/0482* (2013.01); *G06F 3/04842* (2013.01); *G06F 9/542* (2013.01); *G06Q 10/06* (2013.01)

(58) Field of Classification Search
CPC ... G06F 3/0481; G06F 9/542; G06Q 10/0639; G06Q 10/10; G06Q 10/105
See application file for complete search history.

(56) References Cited

U.S. PATENT DOCUMENTS

| | | | | |
|---|---|---|---|---|
| 7,610,564 | B1* | 10/2009 | Pfohe | G06F 3/0482 707/999.003 |
| 2008/0091441 | A1* | 4/2008 | Flammer | G06Q 10/06 705/320 |
| 2009/0305732 | A1* | 12/2009 | Marcellino | H04L 12/587 455/466 |
| 2011/0055756 | A1* | 3/2011 | Chen | G06F 3/0482 715/810 |
| 2011/0055767 | A1* | 3/2011 | Chen | G06F 17/30873 715/841 |
| 2011/0055768 | A1* | 3/2011 | Chen | G06F 3/0482 715/841 |
| 2011/0055771 | A1* | 3/2011 | Chen | G06F 16/904 715/854 |
| 2013/0110565 | A1* | 5/2013 | Means, Jr. | G06Q 10/06 705/7.11 |

(Continued)

*Primary Examiner* — Joy M Weber
(74) *Attorney, Agent, or Firm* — Fountainhead Law Group P.C.

(57) ABSTRACT

Techniques are described for aggregating information from multiple software tools into a manager cockpit. The manager cockpit includes multiple views for presenting the aggregated information in various actionable tiles. When an actionable tile is selected, the manager cockpit presents actions that can be performed on the selected tile. In some embodiments, the manager cockpit can apply a rules engine to generate alerts and a coaching engine to generate recommended actions to remedy the alerts. The recommended actions can be presented as an action that can be performed on the selected tile.

20 Claims, 16 Drawing Sheets

(56) References Cited

U.S. PATENT DOCUMENTS

| | | | |
|---|---|---|---|
| 2013/0332856 A1* | 12/2013 | Sanders | G06F 3/0481 |
| | | | 715/753 |
| 2014/0081903 A1* | 3/2014 | Koosel | G06F 16/254 |
| | | | 707/602 |
| 2014/0143025 A1* | 5/2014 | Fish | G06Q 10/06 |
| | | | 705/7.42 |
| 2015/0310070 A1* | 10/2015 | Stefik | G06F 16/24573 |
| | | | 707/740 |

* cited by examiner

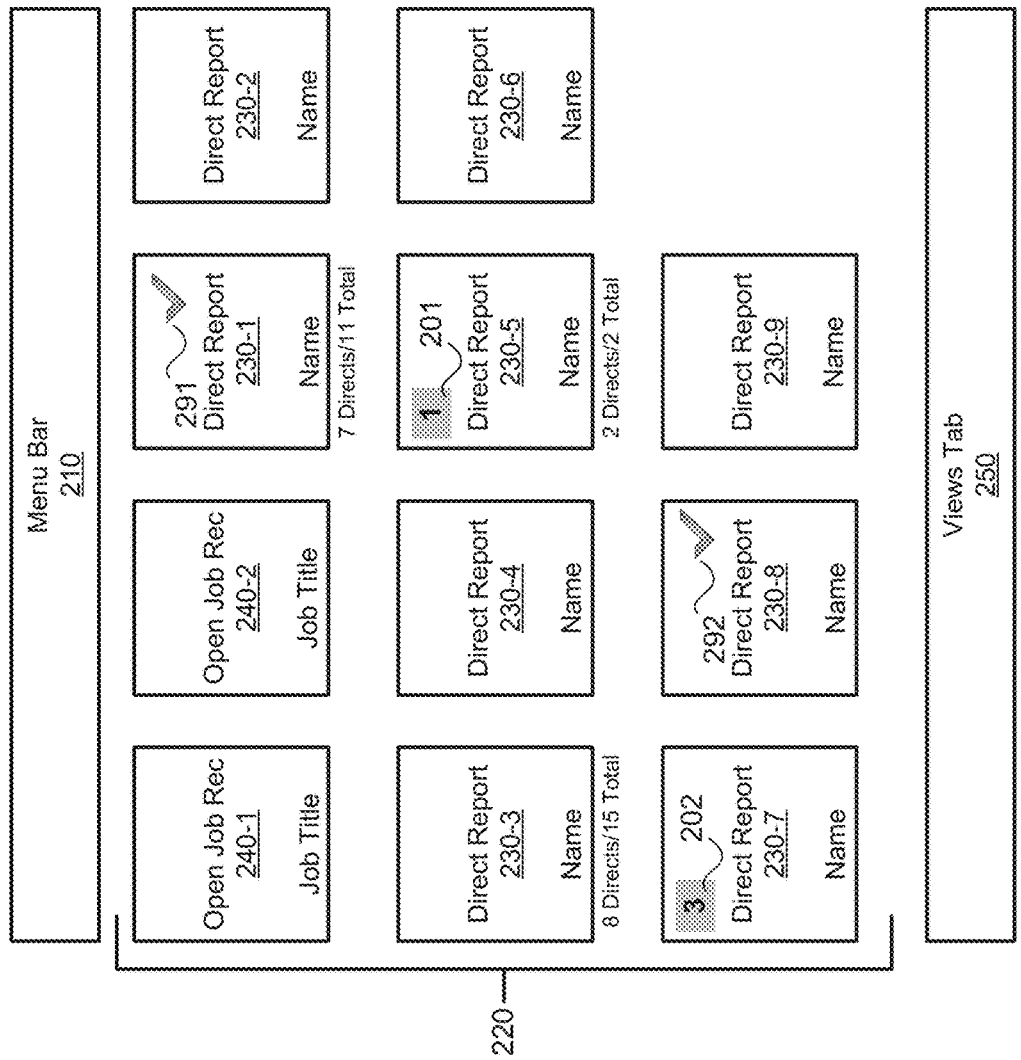
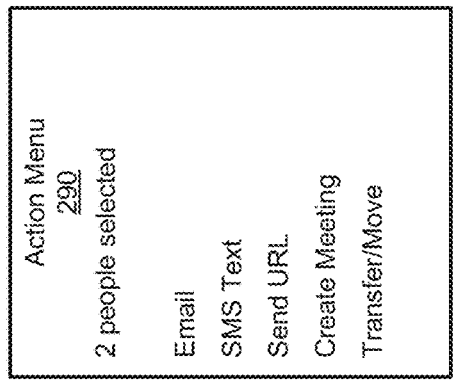
FIG. 2C

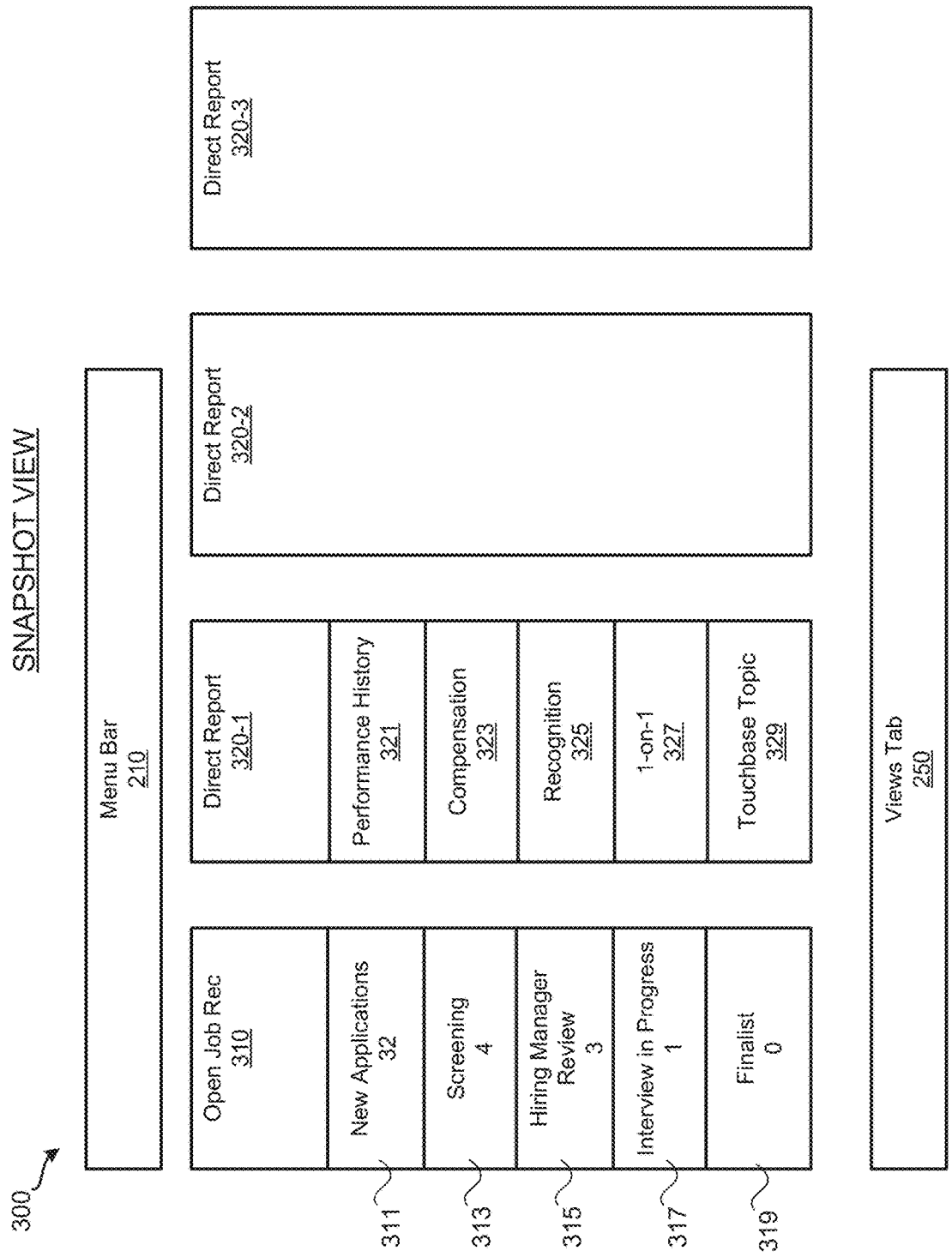

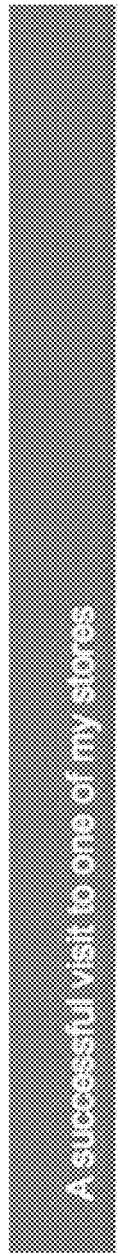
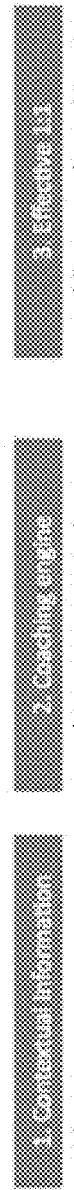
FIG. 12

MANAGER COCKPIT FOR IMPROVING MANAGER PERFORMANCE

CROSS-REFERENCE TO RELATED APPLICATION

The instant nonprovisional patent application claims priority to U.S. Provisional Patent Application No. 61/996,829, filed May 14, 2014 and incorporated by reference in its entirety herein for all purposes.

BACKGROUND

A typical organization includes thousands of employees. An employee with subordinates is traditionally called a manager since the employee manages others while an employee who reports to a manager is traditionally called a direct report. Some employees within the organization can be both a manager and a subordinate since the manager directly reports to another manager. Given the number of employees in an organization, human resource management tools are often used to maximize employee performance. Each tool can useful for managing a different aspect of human resources. For example, a first tool can manage employee performance, a second tool can manage employee goals, and a third tool can manage employee compensation. A manager needs to access multiple software tools throughout the day to evaluate the direct reports. Switching between these software tools can be time consuming and confusing to the manager, particularly a manager with many direct reports. Furthermore, a manager needs to constantly monitor the status of each software tool, which is very cumbersome. Lastly, switching between software products may prevent the manager from fully grasping issues or concerns of the direct reports.

SUMMARY

In one embodiment, a computer-implemented method presents, by a processor, a graphical user interface configured to display a view containing information related to a plurality of direct reports that report to a manager in an organization, the view including a plurality of selectable tiles where each direct report is associated with at least one selectable tile in the view. The method then detects, by the processor, a selection of a first tile from the view that corresponds with a first direct report. The method then determines, by the processor, a first plurality of actions that the manager can perform on the first direct report. The method then presenting, by the processor, the first plurality of actions in an action menu tile.

In one example, the method further includes detecting, by the processor, a selection of a second tile from the view that corresponds with a second direct report, determining, by the processor, a second plurality of actions that the manager can perform simultaneously to the first direct report and the second direct report, and updating, by the processor, the action menu tile by using the second plurality of actions. The second plurality of actions is a subset of the first plurality of actions.

In another example, the first plurality of actions are determined according to a context of the tile and at least one contextual metric associated with the first direct report.

In another example, the method further includes detecting, by the processor, another selection of an action from the first plurality of actions and transmitting, by the processor, an instruction based on the selected action to a software tool from the plurality of software tools that is configured to perform the selected action.

In another example, the method further includes receiving, by the processor, one or more alerts from the plurality of software tools that are relevant to the first direct report, and presenting, by the processor, an icon representative of the one or more alerts on the first tile.

In another example, determining the first plurality of actions includes identifying, by the processor, an action that can resolve an alert from the one or more alerts and including, by the processor, the action in the first plurality of actions.

In another embodiment, a non-transitory computer readable storage medium stores one or more programs comprising instructions for presenting a graphical user interface configured to display a view containing information related to a plurality of direct reports that report to a manager in an organization, the view including a plurality of selectable tiles where each direct report is associated with at least one selectable tile in the view, detecting a selection of a first tile from the view that corresponds with a first direct report, determining a first plurality of actions that the manager can perform on the first direct report, and presenting the first plurality of actions in an action menu tile.

In another embodiment, a computer implemented system comprises one or more computer processors and a non-transitory computer-readable storage medium. The non-transitory computer-readable storage medium comprises instructions, that when executed, present a graphical user interface configured to display a view containing information related to a plurality of direct reports that report to a manager in an organization, the view including a plurality of selectable tiles where each direct report is associated with at least one selectable tile in the view, detect a selection of a first tile from the view that corresponds with a first direct report, determine a first plurality of actions that the manager can perform on the first direct report, and present the first plurality of actions in an action menu tile.

The following detailed description and accompanying drawings provide a better understanding of the nature and advantages of the present disclosure.

BRIEF DESCRIPTION OF THE DRAWINGS

FIG. 2C illustrates the selection of multiple actionable tiles in a team view according to one embodiment;

FIG. 3 illustrates a snapshot view according to one embodiment;

FIG. 12 illustrates another exemplary scenario for recommending actions to the manager;

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Techniques are described for utilizing a manager cockpit to improve manager performance. The manager cockpit is able to aggregate data from multiple software tools and present the aggregated data to the user in one of many views. Each view can include multiple tiles that can present data to the manager. One or more of the tiles can be actionable, thus allowing a manager to perform an action by simply selecting a tile within the view. In some embodiments, selecting a tile in a view can cause the manager cockpit to call upon one of the software tools to perform an action which can be a task or function that is related to managing a direct report. In essence, the manager cockpit can serve as a management center for evaluating and managing direct reports. In some embodiments, the manager cockpit can also include a rules engine and a coaching engine. The rules engine is capable of monitoring direct reports. When an issue is detected by the rules engine, the coaching engine can provide one or more recommended actions to address the issue. Together the rules engine and coaching engine can surface issues on the direct reports to the manager without requiring the manager to manually examine each software tool. By utilizing the manager cockpit, the effectiveness of the manager can be improved.

Manager Cockpit

Figure 1:
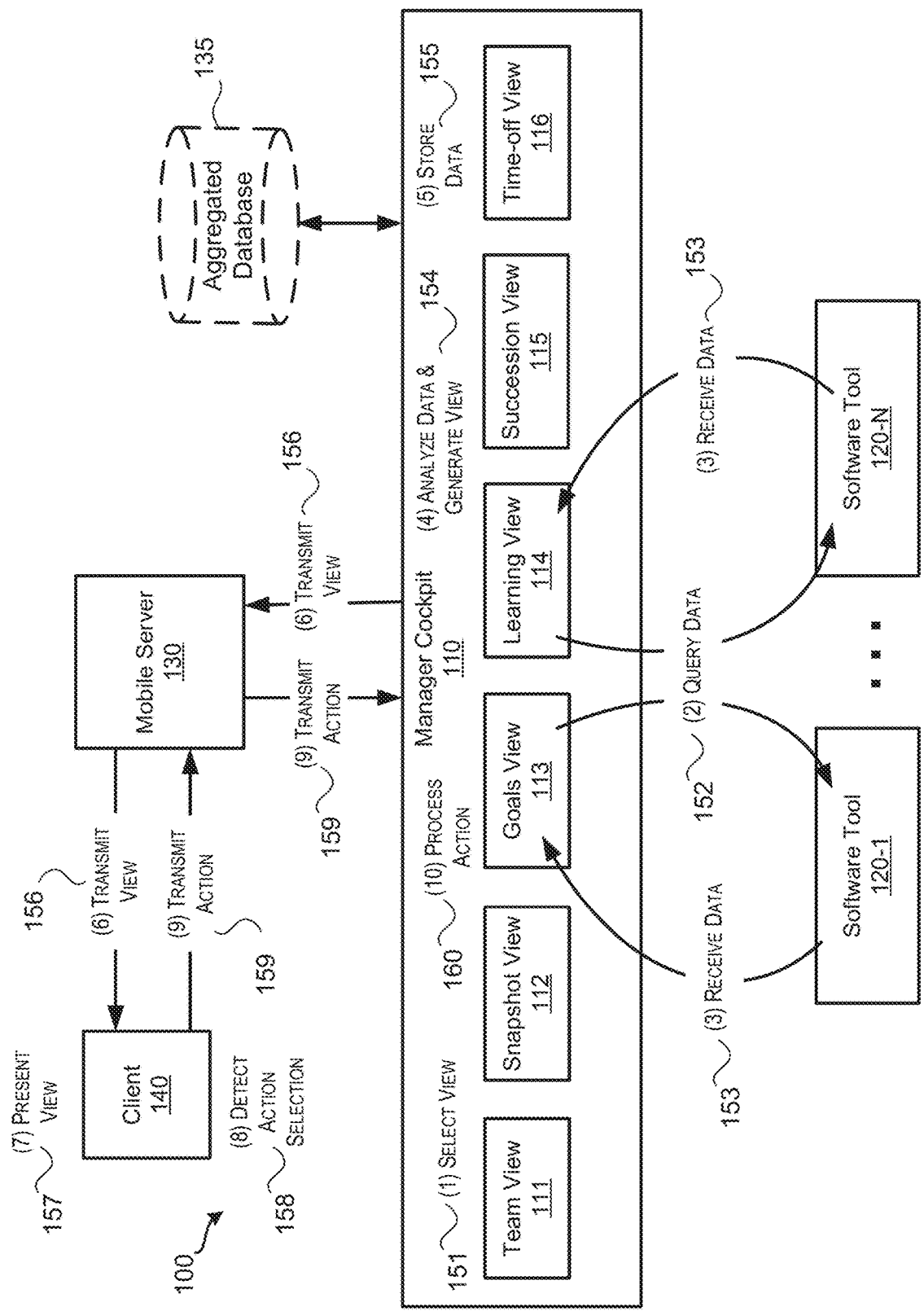
FIG. 1 illustrates a system for managing direct reports according to one embodiment.

FIG. 1 illustrates a system for managing direct reports according to one embodiment. System 100 includes manager cockpit 110, software tools 120-1 to 120-N, mobile server 135, and client 140. Software tools 120-1 to 120-N can be a collection of software tools that are offered by a human resource management company to assist in the management of human resources within an organization. The software tools can include a goal application to manage goals, a calendar application to manage appointments, a compensation application to manage employee compensation, a performance application to manage employee performance, a social media application for interactions between employees, to name a few. Manager cockpit 110 can communicate with software tools 120-1 to 120-N to receive data generated by software tools 120-1 to 120-N or to instruct software tools 120-1 to 120-N to perform a task or function.

Manager cockpit 110 consists of multiple menus that each contain multiple views. Each menu is configured to present information on a particular area of interest while each view presents a subset of the information related to the area of interest. This allows the manager to analyze the information under different lenses. In some examples, a first menu can present information on the manager's direct reports while a second menu can present information on the manager. Here, manager cockpit 110 includes team view 111. Team view 111 can be configured to present a high-level view of the manager's direct reports. This view allows the manager to get an overview of the current status of each direct report. Manager cockpit 110 also includes snapshot view. Snapshot view 112 can be configured to present a mid-level view of the manager's direct reports. This can include the presentation of additional information that is not available in team view 111. For example, contextual metrics on each of the manager's direct reports can be presented in snapshot view 112. Contextual metrics are metrics on a direct report that take into context others within the organization. For example, a contextual metric may be the salary of an employee with respect to other employees within the group or within the organization.

Manager cockpit 110 further includes goals view 113. Typically a manager can have multiple goals that need to be completed. Each goal may have a deadline specifying a point in time when the goal is be completed. To complete each goal, the manager may assign tasks to the manager's direct reports. As the direct reports complete those tasks, the manager gets closer to completing the manager's goal. For example, a manager with a goal to reach a sales quota can assign each direct report a task to complete a portion of the sales quota. As each direct report reaches their sales quota, the manager gets closer to achieving the manager's goal. As another example, a manager can have a goal that each direct report watch a safety video. The manager can assign to each direct report a task to watch the safety video. As each direct report completes the task by watching the safety video, the manager incrementally gets closer to completing the goal. Goals view 113 can be configured to present the goals of the manager along with the tasks assigned to the manager's direct reports which are relevant to completing the manager's goal. This allows the manager to track the progress of the manager's goals along with the progress of the direct reports. Using the example of the sales quota goal, goals view 113 can present a tile illustrating the progress in completing the manager's sales quota along with additional tiles illustrating the progress of each direct report in completing their personal sales quotas.

Manager cockpit 110 further includes learning view 114. Learning view 114 can be configured to present activity that is related to learning. For example, learning view 114 can assist a manager in tracking classes or seminars that are a requirement for the manager's direct reports. Manager cockpit 110 further includes succession view 115. Succession view 115 can be configured to present a hierarchical chart that assigns a successor to each direct report should the direct report leave the organization. Changes to succession can be performed by the manager through manager cockpit 110 or alternatively by the human resources division of the organization. Manager cockpit 110 further includes time-off view 116. Time-off view 116 can be configured to schedule personal time for the manager's direct reports. In time-off view 116, the manager can approve, deny, or change requests from the direct reports. In other embodiments, additional views can be included in manager cockpit 110.

The workflow begins at step (1) (reference number 151) where a view is selected. In one embodiment, the view can be manually selected based on input from the manager. In another embodiment, the view can be automatically selected based on preferences of the manager. For example, manager cockpit 110 can by default present snapshot view 112 based on predefined preferences of the manager. In yet another embodiment, the view can be automatically selected based on attributes of the manager. As an example, manager cockpit 110 can present a view depending on the number of direct reports that the manager has. If the manager has more than a predefined number of direct reports, manager cockpit 110 can by default present team view 111 since more direct reports can be presented simultaneously in team view 111. If the manager has equal to or less than the predefined number of direct reports, then manager cockpit 110 can by default present snapshot view 112 since snapshot view 112 allows more information on the direct reports to be presented to the manager. The amount of additional information that is presented in snapshot view 112 can be based on the resolution of the display on the manager's device and the number of direct reports that the manager has.

Once a view has been selected, the workflow continues to step (2) (reference numeral 152) by transmitting queries to one or more of software tools 120-1 to 120-N. The queried data can be data that is relevant to the selected view. In some examples, manager cockpit 110 can have a predefined set of queries for each view. Depending on the selected view, manager cockpit 110 can transmit the predefined set of queries to one or more software tools to retrieve data relevant to the selected view. The queries can be performed on a predefined schedule or asynchronously upon selecting a view.

After submitting the queries, the workflow continues to step (3) (reference numeral 153) by receiving the queried data. The received data is analyzed to generate the selected view at step (4) (reference numeral 154). Analysis of the received data can include aggregating the data to provide a comprehensive analysis on the direct reports. Optionally, manager cockpit 110 can store the received data in aggregated database 135 at step (5) (reference numeral 155). Storing the data in aggregated database 135 can provide manager cockpit 110 contextual information, such as historical changes to the data or statistical analysis of the data.

At step (6) (reference numeral 156), manager cockpit 110 can transmit the generated view to mobile server 130 which in turn routes the view to client 140. Client 140 can be a computing device operated by the manager. At step (7) (reference numeral 157), client 140 presents the view on a display of client 140 for the manager. The manager can examine the view and select an action to be performed from the view. At step (8) (reference numeral 158), client 140 detects the selection of the action. At step (9) (reference numeral 159), client 140 transmits the action to mobile server 130 which routes the action to manager cockpit 110. At step (10) (reference numeral 160), manager cockpit 110 processes the action. Processing the action can include updating the view or transmitting instructions to a software tool to perform the selected action.

Figure 2A:
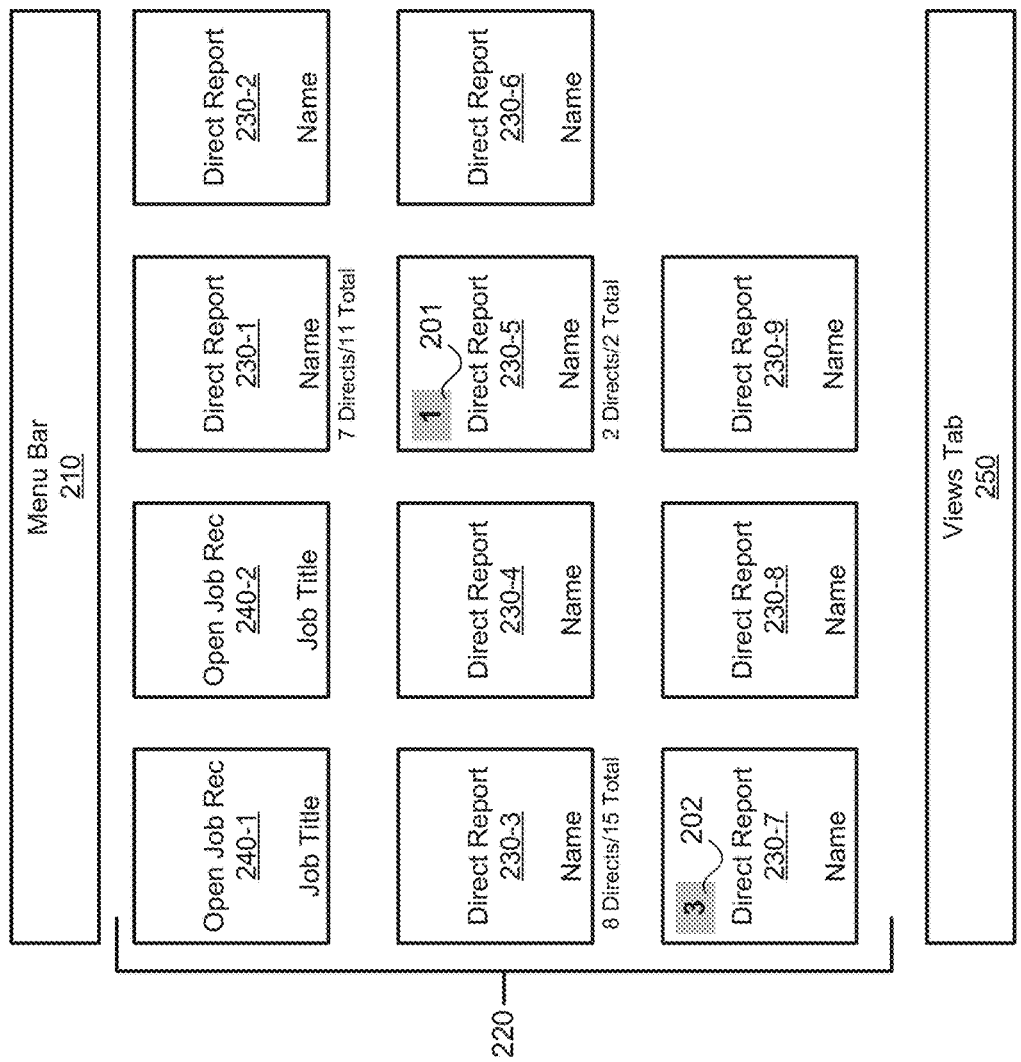
FIG. 2A illustrates a team view according to one embodiment.

FIG. 2A illustrates a team view according to one embodiment. Team view 200 is a high-level overview of the manager's direct reports that is included as part of the "My Team" menu in manager cockpit 110. Team view 200 can be populated with information received from one or more software tools. Team view 200 includes menu bar tile 210, array 220, views tab tile 250, headlines tile 260, and analytics tile 270. Menu bar tile 210 includes a plurality of selectable icons which allow the manager to change menus. Each menu can contain multiple views. In one example, menu bar tile 210 can include a "Me" menu that presents manager information, a "My Team" menu for presenting information on the direct reports of the manager, a "My Network" menu for exploring people within the manager's network, and a "Notifications" menu for presenting alerts to the manager.

Team view 200 further includes array 220. Array 220 can be a two dimensional array of tiles that provide information on direct reports of the manager. Through array 220, the manager can glance over the manager's direct reports to quickly check on the status of the direct reports or identify any issues with the direct reports. Array 220 can include different types of direct reports. One type of direct report that can be included in array 220 is an open job rec. An open job rec is an open position still available that reports to the manager. A tile for an open job rec can provide a summary on the status of an open position that the manager is trying to fill. The open position can be a position for a new direct report. In one example, the summary can include details such as a count on the number of new applications that have been received for the position, a count on the total number of candidates for the position, and a short description of the position (e.g., the role or the location of the position). In some embodiments, manager cockpit 110 can visually modify a tile for an open job rec when there is an alert related to the open job rec. The alert can be due to an upcoming deadline related to the open job rec (e.g., this open job rec should be filled in a week) or can be an alert that new applicants have been received. In one example, the visual modification can be a change to the shade or color of the tile. In another example, the visual modification can be text describing the alert, which is presented as an overlay on the tile. In yet another example, the visual modification can be a number corresponding to the number of alerts that have been detected but not yet viewed. In yet other examples, other visual modifications can be applied to the tile corresponding to the open job rec to notify the manager of newly available information that is relevant to the open job rec.

Another type of direct report that can be included in array 220 is an existing direct report. A tile for an existing direct report can provide a summary on the status of a direct report. The summary can include details such as a profile picture of the direct report, the name of the direct report, the job title of the direct report, and other basic information associated with the direct report. In some examples, additional details such as the number of direct reports that report to the direct report or the total number of direct reports that report directly (or indirectly) report to the direct report can also be included. In one embodiment, manager cockpit 110 can present details on a direct report outside the boundary of the tile that corresponds to the direct report tile. This can be useful for presenting details that are not available for every direct report, such as the number of direct reports that report to the direct report since not every direct report will manage other direct reports.

Here, array 220 includes open job rec tiles 240-1 and 240-2. The tiles for open job rec 240-1 and open job rec tile 240-2 can include the title, location, and the total number of candidates for the corresponding open job rec. As manager cockpit 110 can receive updates from a software tool that more candidates have been received, manager cockpit 110 can update the total number of candidates. In one example, manager cockpit 110 can apply a visual modification to open job rec tile 240-1 to notify the manager that new applicants have been received. As the deadline approaches for filling the open job rec, manager cockpit 110 can apply a different visual modification to open job rec tile 240-1 to notify the manager of the upcoming deadline. Array 220 further includes existing direct report tiles 230-1 to 230-9. Each direct report tile can present a profile picture and a name that corresponds with a direct report. As a result, all of the manager's direct reports can be viewed simultaneously in team view 200. In some examples, the size of the tiles in array 220 can dynamically adjust according to the number of tiles to be displayed. With fewer tiles, the size each tile can be enlarged. Similarly with more tiles, the size of teach tile can shrink. The size of a tile can depend on the number of tiles to be presented and the size of the window for presenting array 220. Manager cockpit 110 can present additional details along the bottom boundary of direct report tile 230-1. The additional details are the number of employees that directly report to the direct report of direct report tile 230-1 and also the total number of employees that directly or indirectly report to the direct report of direct report tile 230-1. Similar additional details is presented along the bottom boundary of direct report tile 230-3 and 230-5. Direct report tile 230-5 is visually modified by visual indicator 201 to notify the manager of a pending alert that has not been addressed (or alternatively has not been viewed) by the manager. Visual indicator 201 can notify the manager that there is one pending alert for the direct report of direct report tile 230-5. Similarly, visual indicator 202 can notify the manager that there are three pending alerts for the direct report of direct report tile 230-5. The alerts can be received from software tools or generated through a rules engine or coaching engine of manager cockpit 110. In some examples, the appearance of the visual indicators can vary depending on the severity of the alert or the number of existing alerts. For example, the size, color, or shape of the visual indicator can depend on the severity of the alert or the number of pending alert that are associated with the tile.

Team view 200 further includes views tab tile 250. Views tab tile 250 includes a plurality of selectable icons for switching views within a menu. Other views that are available can include snapshot view 300 of FIG. 3, goal view 400 of FIG. 4, learning view 500 of FIG. 5, and time-off view 600 of FIG. 6. Selecting one of the selectable icons can result in manager cockpit 110 switching the current view to the selected view. These views will be described in further detail below.

Team view 200 further includes headlines tile 260 and analytics tile 270. Headlines tile 260 can present warnings that are relevant to the manager while analytics tile 270 can present analytics that are relevant to the manager. The warnings and analytics can be related to a single direct report or a group of direct reports. For example, manager cockpit 110 can present a warning in headlines tile 260 that the voluntary termination rate of the manager's direct reports is above a predefined threshold. The warning can include a chart tracking the voluntary termination rate over time. As another example, manager cockpit 110 can present a warning in headlines tile 260 that the manager's direct report is at risk of leaving the organization. The warning can include one or more factors describing why the direct report is at risk. The warning can also include one or more possible solutions that may help the organization retain the employee. If manager cockpit 110 has multiple warnings to present, manager cockpit 110 can cycle through the warnings in headlines tile 260. Each warning can be presented in headlines tile 260 for a predefined period of time. When a warning has been addressed by the manager, manager cockpit 110 can remove the warning from headlines tile 260.

Manager cockpit 110 can present analytics on the manager's performance over time in analytics tile 270. The analytics can include performance metrics of the manager such as the manager's retention rate and the manager's sales. The analytics can be contextual and describe the changes over time or compared to other managers within the organization. In some embodiments, manager cockpit 110 can present related information in headlines tile 260 and analytics tile 270. In one example, manager cockpit 110 can select or generate analytics to present in analytics tile 270 based on the warning or type of warning being presented in headlines tile 260. This ensures that the analytics being presented is relevant to the headline being presented. For instance, manager cockpit 110 can present analytics related to the retention rate in analytics tile 270 when a warning on the retention rate has fallen below a threshold is being presented in headlines tile 260. In some examples, the warnings and analytics can be provided by a coaching engine of manager cockpit 110. In other examples, the warnings and analytics can be provided by software tools.

Figure 2B:
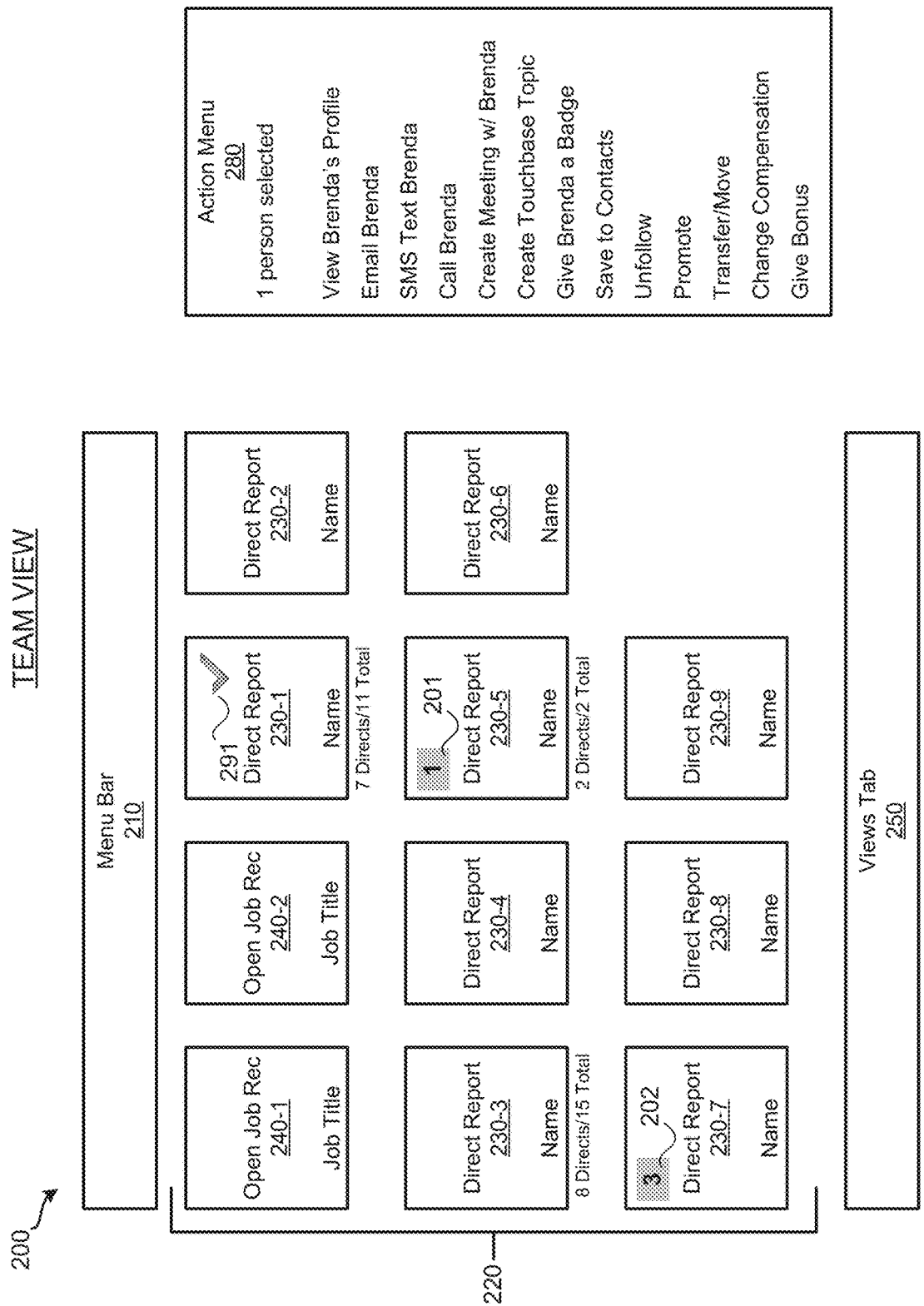
FIG. 2B illustrates the selection of an actionable tile in a team view according to one embodiment.

In some embodiments, a view can contain actionable tiles. An actionable tile is a tile that, when selected, can trigger one or more actions. Typically, manager cockpit 110 can monitor the selection of an actionable tile. When manager cockpit 110 detects that an actionable tile is selected, manager cockpit 110 can perform an action or present a group of actions for the manager to select from. FIG. 2B illustrates the selection of an actionable tile in a team view according to one embodiment. As shown, manager cockpit 110 has detected that direct report tile 230-1 has been selected based on selection 291. Selection 291 can be a touch or click gesture detected on or near direct report tile 230-1. Upon detecting selection 291, manager cockpit 110 can generate action menu 280 on team view 200. Action menu 280 can contain a list of one or more actions that can be performed on the direct report of direct report tile 230-1. In one example, manager cockpit 110 can query software tools that are accessible by the manager to identify the one or more actions that can be performed on the direct report. Here, the action "View Brenda's Profile" can be an action that can be performed by a first human resource tool while the action "Create Meeting w/Brenda" can be an action that can be performed by a second human resource tool. When it is detected that the manager has selected an action from action menu 280, the action can be transmitted to the proper software tool to perform the action. In one embodiment, the system can run the software tool in another thread and perform the action. Once the action has been performed, the results of the action can be passed back to manager cockpit 110 to be presented to the manager. In another embodiment, manager cockpit 110 can be suspended as the software tool is run and the action is performed. In some examples, manager cockpit 110 can overlay action menu 280 on top of existing tiles in team view 200. Here, action menu 280 is placed over headlines tile 260 and analytics tile 270. Once an action is selected from action menu 280, manager cockpit 110 can remove action menu 280 from team view 200, thus allowing headlines tile 260 and analytics tile 270 (which appear to be underneath action menu 280) to be revealed.

In some embodiments, manager cockpit 110 can allow multiple actionable tiles to be selected simultaneously. Each actionable tile is associated with a set of actions which can be performed when the actionable tile is selected. When multiple actionable tiles are selected, manager cockpit 110 can present a list of actions that can be performed on the selected direct reports that correspond to the selected actionable tiles. In one embodiment, manager cockpit 110 can identify one or more intersecting actions that are shared amongst the selected direct reports. An intersecting action is an action that appears in the set of actions for each selected direct report. Thus, the intersecting action is a common action that appears in the sets of actions. FIG. 2C illustrates the selection of multiple actionable tiles in a team view according to one embodiment. As shown, manager cockpit 110 has detected selection 291 selecting direct report tile 230-1 and detected selection 292 selecting direct report tile 230-8 in team view 200. Upon detecting the second selection (selection 292), manager cockpit 110 can update action menu 280 to action menu 290, which is a subset of the actions available in action menu 280. The subset of actions are actions which can be performed on the direct reports that correspond to direct report tile 230-1 and 230-8 at the same time. Here, action menu 290 indicates the number of people selected (e.g., 2) and the actions that can be performed on both people. The actions include email both people, send an SMS text to both people, send a URL to both people, create a meeting that that invites both people, and transfer/move both people to a different group. However, it would not make sense to promote or change the compensation of both people simultaneously. As a result, these actions are not presented as part of action menu 290. As more direct reports are selected, the list of actions in action menu 290 may become smaller. As direct reports are unselected, the list of actions in action menu 290 may become larger. In other embodiments, action menu can include actions for responding to warnings or analytics generated by manager cockpit 110. The warnings or analytics can be generated from a rules engine and coaching engine of manager cockpit 110.

FIG. 3 illustrates a snapshot view according to one embodiment. Snapshot view 300 is a mid-level overview of the manager's direct reports that is included as part of the "My Team" menu in manager cockpit 110. Snapshot view 300 provides more details on open job recs and direct reports than team view 200 in exchange for presenting fewer open job recs and direct reports simultaneously in the view. As shown here, snapshot view 300 includes menu bar 210, open job rec 310, direct reports 320-1, 320-2, and 330-3, and views tab 250. The manager may have additional direct reports or open job recs which can be presented in snapshot view 300. Through scrolling (e.g., using a swipe gesture to scroll open job rec 310 and direct report 320-1 out of snapshot view 300), manager cockpit 110 can present additional tiles that correspond to other direct reports. Menu bar 210 and views tab 250 can be similar or substantially similar to menu bar 210 and views tab 250 of FIG. 2A.

Manager cockpit 110 can present different information for open job recs than for direct reports. For example, manager cockpit 110 can present a different set of information on a tile corresponding to an open job rec than a tile corresponding to an existing direct report. Each tile can include a plurality of sub-tiles for presenting the set of information. The information that is presented in a given sub-tile can be predetermined. Here, manager cockpit 110 has been predefined to include in open job rec 310 of snapshot view 300 a plurality of sub-tiles that include sub-tile 311 for listing the number of applications that have been received for the open job rec, sub-tile 313 for listing the number of applicants that have made it past the initial screening, sub-tile 315 for listing the number of applicants that have made it to hiring manager review, sub-tile 317 for listing the number of applicants that are currently being interviewed, and sub-tile 319 to list the number of applicants that have made it as a finalist. These sub-tiles break down the progress of completing an open job rec. Similarly direct report 320-1 can include sub-tile 321 to present metrics on the performance history, sub-tile 333 to present metrics on the compensation, sub-tile 355 to present metrics on recognition, sub-tile 357 to preset information on the upcoming 1 on 1, and sub-tile 329 to present a touchbase topic between the manager and direct report 320-1. The information presented in the sub-tiles can be include contextual metrics which allow the manager to review employee metrics within the context of others in the organization.

Similar to the actionable tiles in FIG. 2B, the sub-tiles in snapshot view 300 can also be actionable. Selection of a sub-tile can cause manager cockpit 110 to present detailed information related to the selected sub-tile. For instance, selection of sub-tile 311 can cause manager cockpit 110 to present details on the 32 new applications and selection of sub-tile 317 can cause manager cockpit 110 to present detailed information related to the progress of the in person interviews for the open job rec. Similarly, selecting compensation 323 can provide additional details such as changes in compensation for direct report 320-1 over time.

Figure 4:
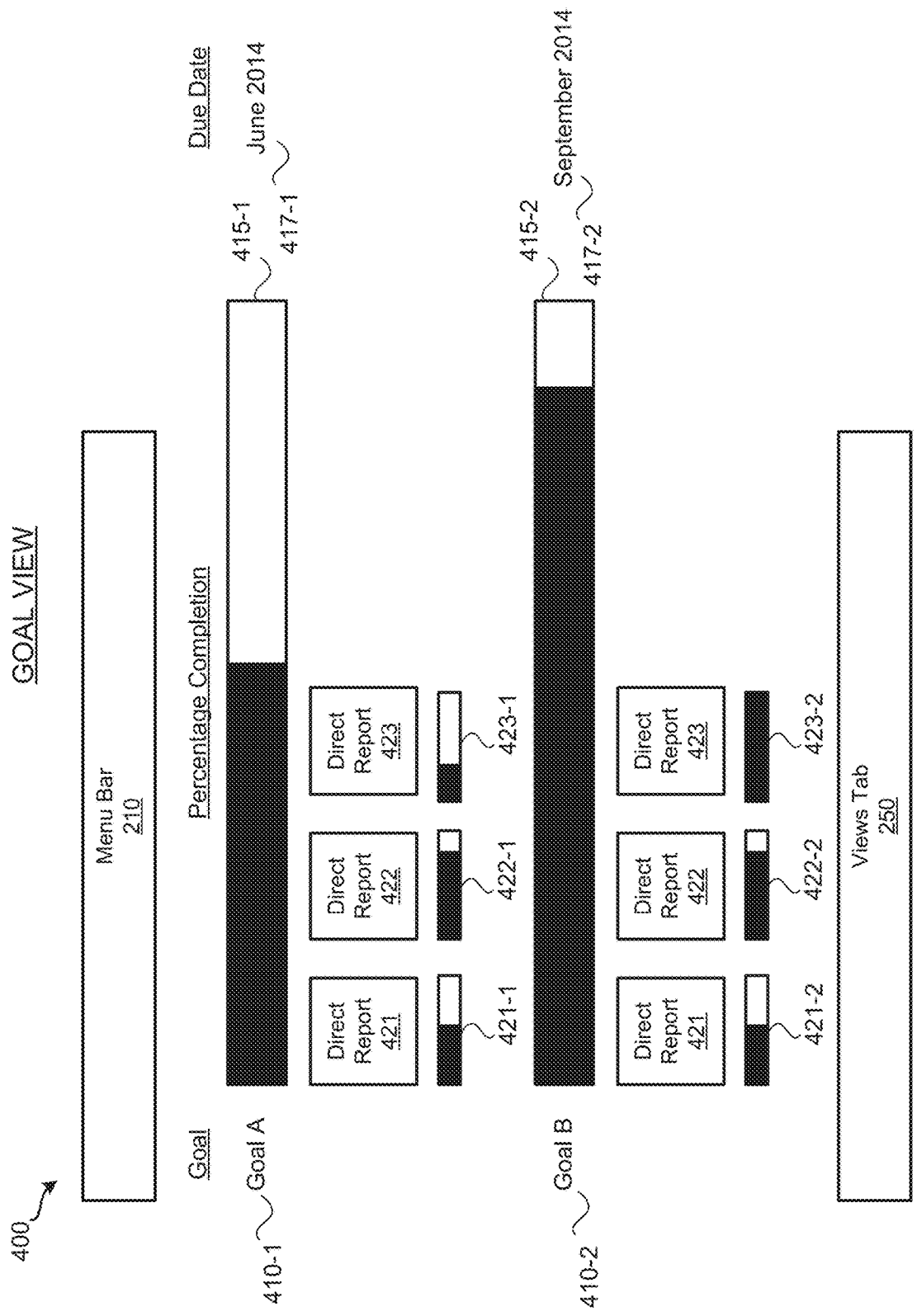
FIG. 4 illustrates a goal view according to one embodiment.

FIG. 4 illustrates a goal view according to one embodiment. Goal view 400 is configured to monitor the progress of goals that belong to the manager. A goal can be assigned to the manager by a superior. For example, the head of the department can assign the manager a sales goal for the quarter. When a manager receives a goal, the manager can delegate sub-goals to the manager's direct reports. The completion of a sub-goal by a direct report advances the manager's goal. Goal view 400 can monitor the completion of the manager's goal and the completion of each sub-goal that was delegated for the purpose of completing the manager's goal. Thus, goal view 400 provides an overview of the status of the manager's goal.

As shown here, goal view 400 includes menu bar 210 and views tab 250, which can be similar or substantially similar to menu bar 210 and views tab 250 in FIG. 2A. Goal view 400 further includes goal 410-1, goal completion tile 415-1, and goal due date 417-1 which are details on a manager's goal. Goal 410-1 is a short description of the manager's goal while goal due date 417-1 is the date in which the manager's goal should be completed by. Goal completion tile 415-1 presents a bar chart that signifies the percentage completion of the manager's goal. As steps are performed to advance the manager's goal, the bar chart can be updated to illustrate the advancement. Multiple goals can be presented simultaneously in goal view 400. Here, goal view 400 includes a second manager's goal, the details of which are presented as goal 410-2, goal completion tile 415-2, and goal due date 417-2.

Goal view 400 further presents details on the sub-goals that were delegated from the manager's goal. Here, sub-goal completion tiles 421-1, 422-1, and 423-1 each represent a sub-goal that was delegated from goal 410-1. Each sub-goal can be assigned to a direct report of the manager. Goal view 400 includes direct report tile 421 which is associated with sub-goal completion tile 421-1, direct report tile 422 which is associated with sub-goal completion tile 422-1, and direct report tile 423 which is associated with sub-goal completion tile 423-1. In one example, direct report tile 421 can include a profile picture of the direct report (i.e., avatar) responsible for the completion of the sub-goal associated with sub-goal completion tile 421-1. Similarly, an avatar can be included in direct report tile 422 and direct report tile 422. Similarly, sub-goal completion tiles 421-2, 422-2, and 423-2 are presented as sub-goals of goal 410-2.

In some embodiments, the tiles in goal view 400 can be actionable tiles which can perform actions when selected. Each actionable tile can be associated with one or more actions. When an actionable tile is selected, manager cockpit 110 can present the one or more actions in an action menu that are related to the selected actionable tile. In one embodiment, selecting goal completion tile 415 can cause manager cockpit 110 to generate an action menu containing actions that can be performed on multiple direct reports. For example, selecting goal completion tile 415-1 can result in manager cockpit 110 presenting one or more actions that can simultaneously be performed on direct report 421, 422, and 423. For instance, an action can be to email, SMS text, or otherwise notify the direct reports that they have not completed their sub-goals. Direct reports that have completed the sub-goal (identifiable by a completed sub-goal completion tile) can be left out of the notification. As another example, selecting goal completion tile 415-1 can result in manager cockpit 110 presenting an action to change the due date of goal 410-1. When the due date is changed through the action, manager cockpit 110 can automatically update the due dates for the sub-goals of goal 410-1. In another embodiment, manager cockpit 110 can generate an action menu containing actions that can be performed on a single direct report when a direct report tile (e.g., direct report tile 421, 422, or 423) or a sub-goal completion tile (e.g., sub-goal completion tile 421-1, 422-1, or 423-1) is selected. The actions can be similar or substantially similar to the actions which appear in action menu 280 of FIG. 2B. In some examples, actions which communicate with the direct report can include an automated message that mentions the manager's goal, or the direct report's sub-goal. For instance, the automated message for the direct report can mention that the sub-goal has not been completed, the upcoming due date for the manager's goal, or the upcoming due date for the direct report's sub-goal. Similar to goal 410-1, goal 410-2 includes sub-goal completion tiles and profile pictures of the direct report that correspond with the sub-goal completion tiles. Sub-goal completion tile 423-2 shows that direct report 423 has completed the sub-goal. In one embodiment, the sub-goal completion tile can remain in goal view 400 even when the sub-goal is completed to serve as an indicator to the manager that the direct report has completed the sub-goal.

In some embodiments, manager cockpit 110 can utilize a rules engine to monitor the manager's goals to determine whether the manager is likely to complete the goal by the due date. If it is determined that the manager is unlikely to complete the goal by the due date, manager cockpit 110 can generate an alert. A coaching engine of manager cockpit 110 can provide recommended actions to the manager. The actions can include contacting the direct reports to complete their sub-goals and contacting the manager's manager to request an extension on the due date for the goal.

Figure 5:
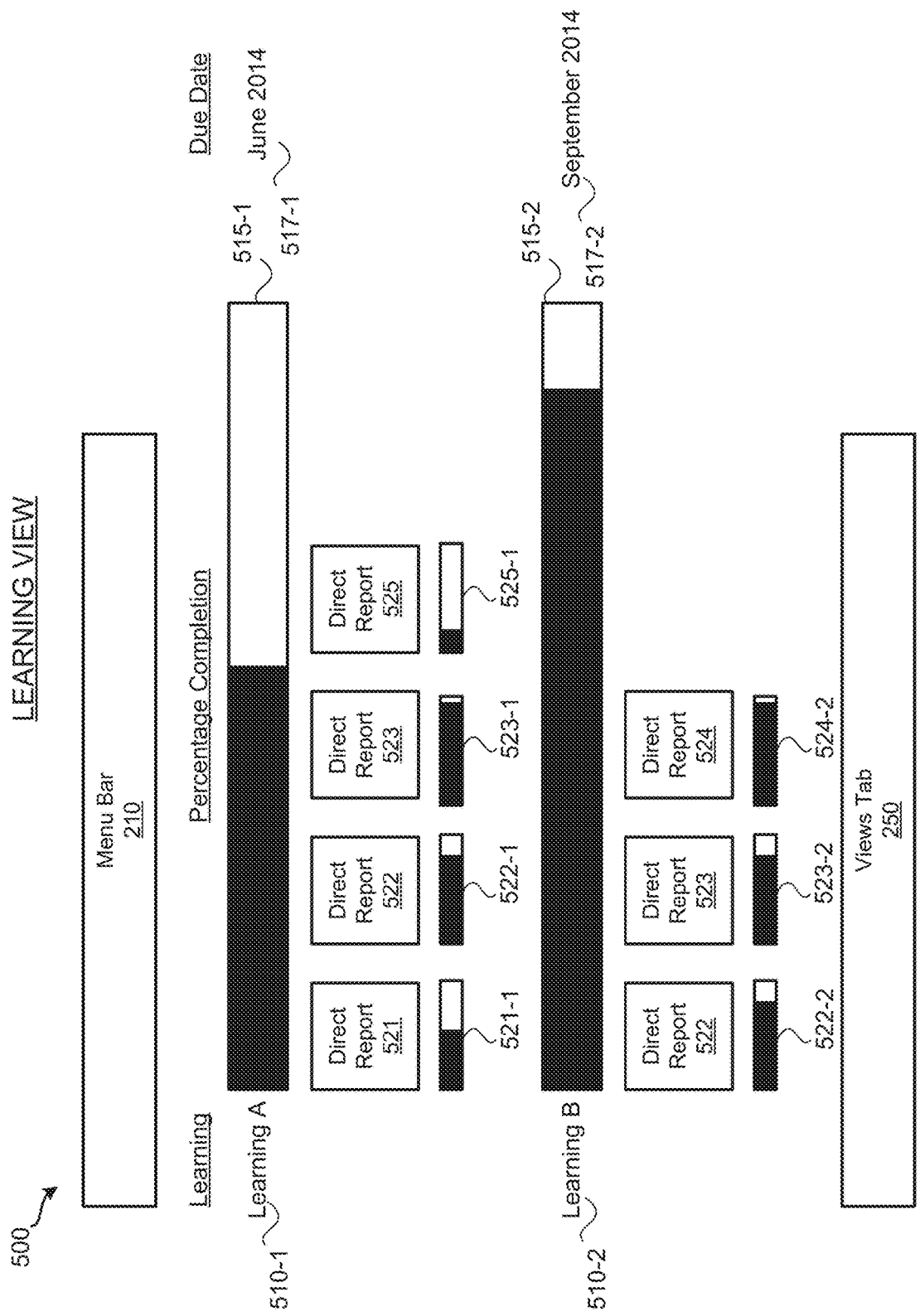
FIG. 5 illustrates a learning view according to one embodiment.

FIG. 5 illustrates a learning view according to one embodiment. Learning view 500 is configured to monitor learning activities of the manager. Learning activities can include onboarding courses or safety courses that employees of the organization must complete. A manager may be responsible for ensuring that direct reports of the manager complete these learning courses. Manager cockpit 110 may offer learning view 500 to assist the manager in managing the completion of these learning courses.

Learning view 500 includes menu bar 210 and views tab 250. Learning view 500 further includes learning task 510-1, learning task percentage completion tile 515-1, due date tile 517-1, direct report tiles 521, 522, 523, and 525, and the corresponding sub-learning completion tiles 521-1, 522-1, 523-1, and 525-1. Direct report 524 is not shown since direct report 524 has already completed learning task 510-1. Similar to goal view 400, learning task percentage completion tile 515-1 can track the progress of completing learning task 510-1 while sub-learning completion tiles 521-1, 522-1, 523-1, and 525-1 can track the progress of the direct report's completion of learning task 510-1. In one embodiment, direct reports that have completed learning task 510-1 are removed from underneath learning task percentage completion tile 515-1. As a result, only direct reports whom have not completed learning task 510-1 will be displayed. This can allow the manager to focus on the direct reports who still need to finish the learning task.

In some embodiments, the tiles in learning view 500 can be actionable. Similar to goal view 400 of FIG. 4, selection of a single actionable tile that corresponds to a direct report can result in manager cockpit 110 displaying an actions menu containing actions that can be performed on the selected direct report. Selection of multiple actionable tiles that correspond to multiple direct reports can result in manager cockpit 110 displaying an actions menu containing actions that can be performed simultaneously on all the selected direct reports. Selection of learning task percentage completion tile 515-1 can result in manager cockpit 110 displaying an actions menu containing actions that can be performed simultaneously on all the direct reports who have not completed the learning task (e.g., direct report 521, 522, 523, and 525). In other embodiments, a rules engine and coaching engine can be warn the manager when it the due date for a learning task approaches.

Figure 6:
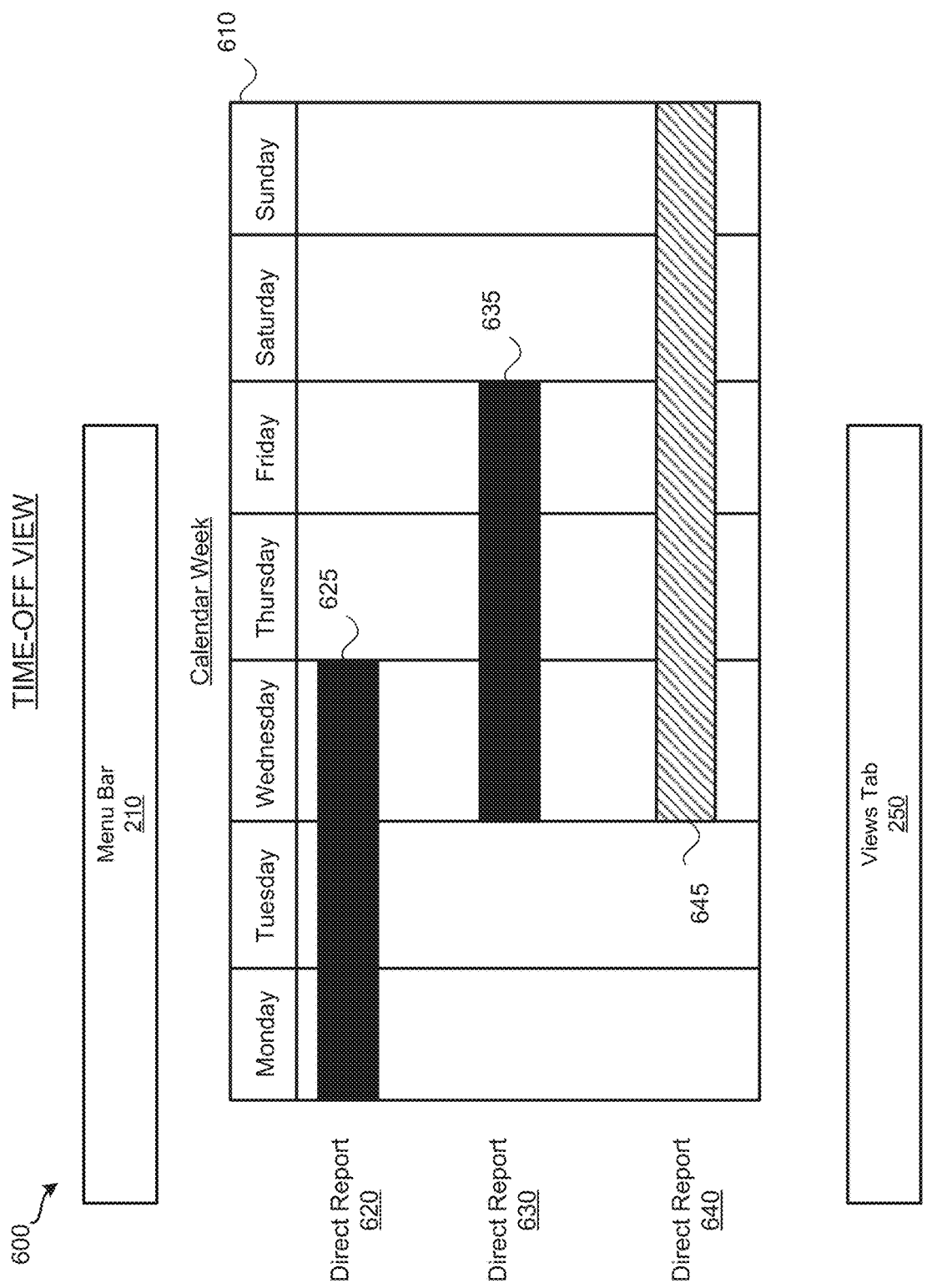
FIG. 6 illustrates a time-off view according to one embodiment.

FIG. 6 illustrates a time-off view according to one embodiment. A manager may manage the periods of time which direct reports can take time off. This is important since there may be rules or regulations set by the organization that a threshold number of employees must be working each day or the maximum number of employees that can take time off at any given point in time. Traditionally, a software tool is used by direct reports to request for time off and by managers to approve requests. Manager cockpit 110 can generate time-off view 600 so that the manager can track and manage the periods of time that the manager's direct reports take off directly through manager cockpit 110.

Time-off view 600 includes chart 610. Chart 610 presents a week of time along the x-axis and the manager's direct reports along the y-axis. In other embodiments, the period of time and the axis in which the period of time is presented can vary. Here, direct report 620 is in the first row of chart 610, direct report 630 is in the second row of chart 610, and direct report 640 is in the third row of chart 610. Chart 610 can display requested time-off and approved time-off for a direct report in the row that corresponds to the direct report. For example, time-off requests and approvals for direct report 620 are presented in the first row while time-off requests and approvals for direct report 620 are presented in the second row. In some embodiments, requests and approvals can be visually distinct from one another, thus allowing the manager to quickly distinguish approved time-off from requested time-off. Here, approved time-off (e.g., blocks 625 and 635) are presented as a solid black box while requested time-off (e.g., block 645) is presented as a dashed box. In other embodiments, approved time-off and requested time-off can be represented using other visual cues.

In some embodiments, the blocks within chart 610 can be actionable. When a block is selected, manager cockpit 110 can generate an actions menu containing actions which can be performed on the selected block. The actions can include approving a requested time-off, changing a requested time-off, denying a requested time-off, changing an approved time-off, cancelling an approved time-off, and contacting the direct report. When contacting the direct report, manager cockpit 110 can automatically populate a portion of the message. For example, the recipient can be set to the direct report, the subject line can state that this message is related to taking a period of time off, or the body of the message can include the requested/approved time-off. In one embodiment, manager cockpit 110 can automatically transmit a message to the direct report when an action to change, deny, cancel, or approve time-off is detected. The message can notify the direct report on the status of the time-off request.

In other embodiments, a rules engine and a coaching engine can be utilized to ensure that the time off taken by direct reports follow one or more rules. For example, the rules engine can monitor the direct reports to ensure that a predefined number of direct reports are working at all times. This can guarantee that the organization is properly staffed. If there is a time period where the predefined number of direct reports are not assigned to work, the coaching engine can provide one or more recommended changes to the time-off schedule that would address the issue. Manager cockpit 110 can present an alert in time-off view 600, which when selected, can present the recommended changes to the manager.

Coaching Engine

In some embodiments, manager cockpit 110 can include a rules engine and a coaching engine. Together, the rules engine and the coaching engine can monitor the information received by manager cockpit 110 and provide recommendations when it is possible to improve the manager's performance. The recommendations can be provided to the manager while the manager is in a view.

Figure 7:
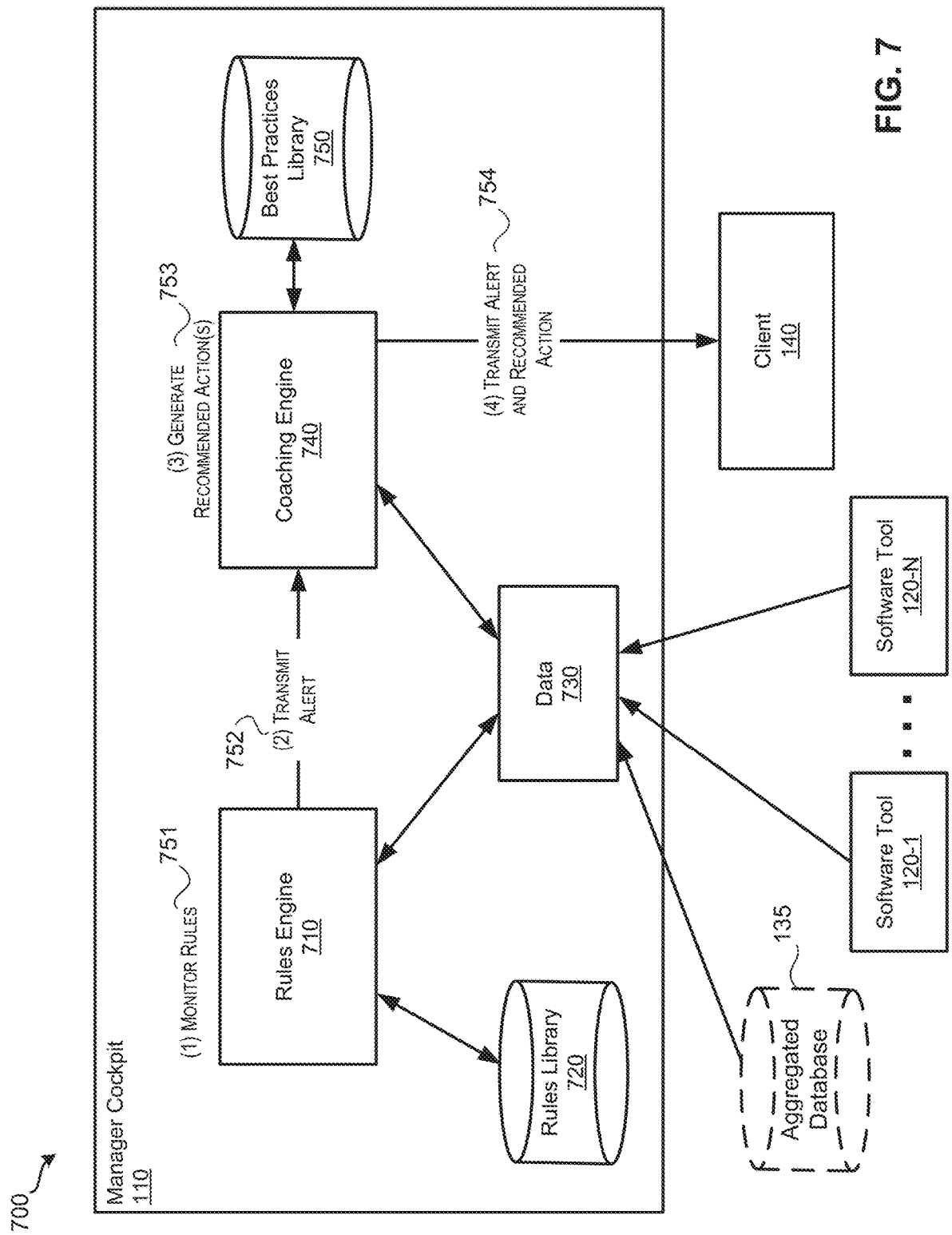
FIG. 7 illustrates a system for recommending actions to a manager according to one embodiment.

FIG. 7 illustrates a system for recommending actions to a manager according to one embodiment. As shown here, manager cockpit 110 can include rules engine 710, rules library 720, data 730, coaching engine 740, and best practices library 750. Rules engine 710 is configured to execute rules from rules library 720. Each rule can monitor data 730 and can trigger an alert when a condition within in the rule is met. Data 730 can include data from software tools 120-1 to 120-N and data from aggregated database 135, which stores data previously received from software tools 120-1 to 120-N.

Figure 8:
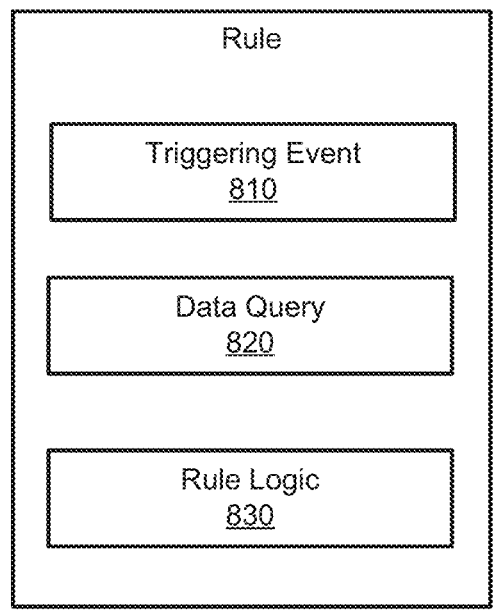
FIG. 8 illustrates an exemplary rule according to one embodiment.

FIG. 8 illustrates an exemplary rule according to one embodiment. Rule 800 includes triggering event 810, data query 820, and rule logic 830. Triggering event 810 can specify when the rule 800 is executed. In one embodiment, triggering event 810 can specify that the rule be executed when an event occurs, such as a change to a goal or sub-goal. In another embodiment, triggering event 810 can specify that the rule be executed in a predefined interval, such as once a day. In yet another embodiment, triggering event 810 can specify that the rule be executed when client 140 enters a predefined area, such as a store location. The location of client 140 can be tracked using devices which measure the GPS coordinates of client 140. Rules engine 810 can monitor the triggering event of the rules in rules library 810 and execute a rule when the corresponding triggering event occurs.

Rule 800 also includes data query 820. Data query 820 defines queries, that when executed by rules engine 710, retrieve data from data 730. The retrieved data can include metrics which are in turn evaluated by rule logic 830 to determine whether an alert should be generated. In other embodiments, the rules engine 710 can query software tools for the data. Rule logic 830 can include one or more conditions that apply to the retrieved data. When a condition is met, rule logic can trigger an alert. In one example, rule logic 830 can include a condition that checks whether the manager is on track to complete a goal. The manager's progress in completing the manager's goal can be compared against the predicted rate of completion, the amount completed, and the time remaining. If the manager's progress is insufficient to complete the manager's goal in the time remaining (e.g., manager's progress so far is below the desired threshold), the condition is met and rule logic 830 can generate an alert.

Figure 9:
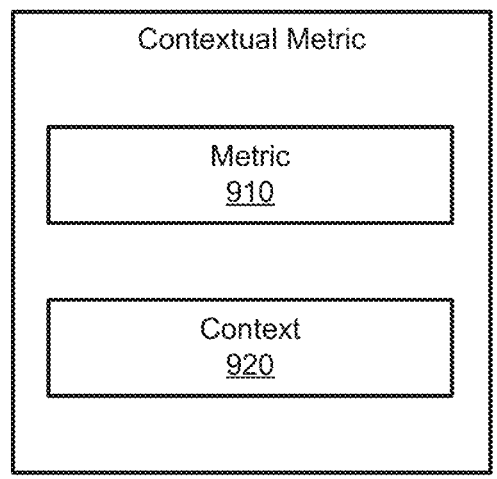
FIG. 9 illustrates an exemplary contextual metric according to one embodiment.

In some embodiments, the metrics retrieved from data 730 can include contextual metrics. FIG. 9 illustrates an exemplary contextual metric according to one embodiment. Contextual metric 900 includes metric 910 and context 920. Context 920 can provide context to metric 910 by comparing metric 910 against others in the organization. For example, a metric can be employee salary while the context can be peers within the organization having the same position or the same grade. As another example, a metric can be the potential of a direct report and the context can be other direct reports of the manager. As a result, contextual metrics allows a manager evaluate an employee's metrics in context of others within the organization. In some embodiments, contextual metrics can be generated by manager cockpit 110 and presented in a view such as a sub-tile in snapshot view 300. Alternatively, manager cockpit 110 can generate a contextual metric and store it within aggregated database 135.

Returning to FIG. 7, the workflow begins at step (1) (reference numeral 751) with rules engine 710 monitoring the rules in rules library 720. Rules engine 710 can perform a first query on data 730 for updates to determine whether a rule has been triggered. If a rule has been triggered, rules engine 710 can perform a second query on data 730 for metrics used by the rules logic to determine whether an alert should be triggered. If an alert is triggered, the workflow continues to step (2) (reference numeral 752) where the alert is transmitted to coaching engine 740. Once coaching engine 740 receives the alert, the workflow continues to step (3) (reference numeral 753) where coaching engine 740 applies a best practice from best practice library 750 to generate one or more recommended actions. Coaching engine 1000 can retrieve a best practice from best practices library 750 based on the alert received from rules engine 710. For example if the alert is a warning on an overdue 1:1 meeting, the best practice retrieved from best practices library 750 can be related to remedying the missed 1:1 meeting, which can include scheduling a 1:1 meeting in the near future. At step (4) (reference numeral 754) the alert(s) generated by rules engine 740 and the recommended action(s) generated by coaching engine 740 are transmitted to client 140. In one embodiment, the alert and recommended action can be transmitted to client 140 as part of a view.

Figure 10:
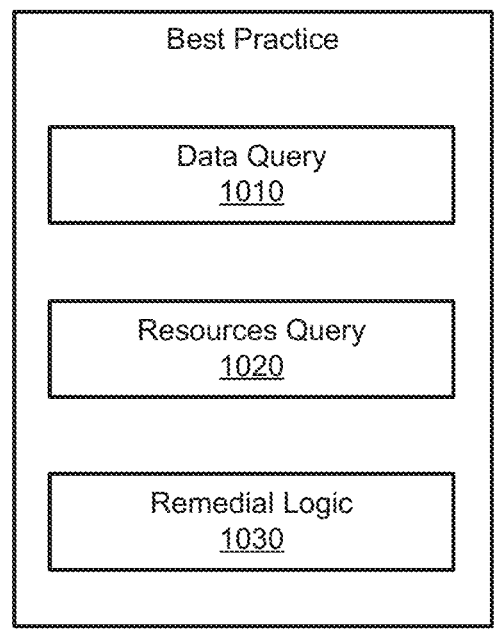
FIG. 10 illustrates an exemplary best practice according to one embodiment.

FIG. 10 illustrates an exemplary best practice according to one embodiment. Best practice 1000 includes data query 1010, resources query 1020, and remedial logic 1030. Data query 1010 can be executed by coaching engine 1000 to retrieve information from data 730. The information can include metrics, some of which can be contextual. Data query 1010 can define the metrics that are retrieved or define how to generate the metrics from retrieved data. Best practice 1000 also includes resources query 1020. Resources query can be configured to determine the organizational resources that are available to help remedy the underlying issue that generated the alert. For example, the organizational resources can include the budget remaining in the group or raise restrictions that are dictated by the organization. The organizational resources can also include the vacation days that have been allotted to the manager's direct reports. Best practice 1000 further includes remedial logic 1030. Remedial logic 1030 can analyze the metrics and the available resources to generate recommended actions. In some embodiments, remedial logic 1030 can include multiple potential actions to handle an alert and the analytics may recommend actions from the potential actions based on the metrics and the resources available.

Figure 11:
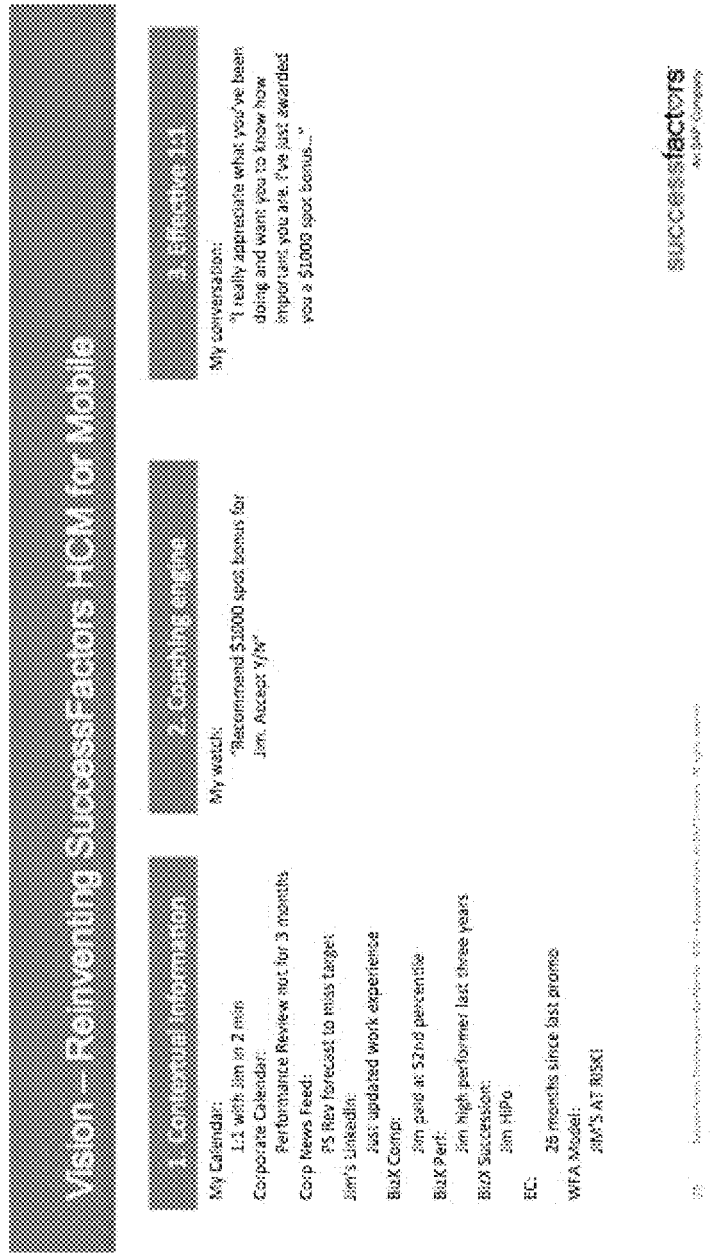
FIG. 11 illustrates an exemplary scenario for recommending actions to the manager.

FIG. 11 illustrates an exemplary scenario for recommending actions to the manager. Here, the manager is about to have a 1:1 with a direct report named Jim. As shown in scenario 1100, the rules engine can receive contextual information from multiple sources, including software tools and an aggregated database that are accessible by the rules engine. Here, the rules engine receives contextual information that includes a notification from a calendar application that a 1:1 meeting is scheduled with Jim within two minutes. This notification can trigger a rule within rules engine for determining whether employee churn is a concern for Jim.

The rules engine can query other software tools to retrieve additional contextual information relevant to determining whether Jim is at risk of leaving the organization. This additional contextual information can include a notification from a corporate calendar application stating Jim has not received a performance review for three months. The additional contextual information can also include a notification from an internet search application stating that Jim has updated his work experience on a recruiting website. The additional contextual information can also include a notification from a business application stating that is paid at the 52th percentile and has been a high performer for the past three years. An employee compensation application can transmit a notification that Jim has not received a promotion in the past 26 months. The rules engine can process the additional contextual information and determine that Jim is at risk of leaving the organization. In some examples, the rules engine can generate an alert in response to the determination.

The coaching engine receives the alert and recommends an action to help rectify the risk of Jim leaving. The coaching engine can base the recommendation on the same contextual information and optionally additional information such as information on the resources available to the manager to rectify the situation. Here, the coaching engine recommends that a $1000 spot bonus should be offered to Jim during the 1:1 meeting. This recommendation can be transmitted to a client device operated by the manager. Exemplary client device can include a desktop computer, a laptop computer, or a portable electronic device such as a watch or mobile phone. If the recommendation is acceptable to the manager, the manager can accept the recommendation. Once the recommendation is accepted, the manager cockpit (or coaching engine) can transmit an instruction to the employee compensation application to issue a $1000 spot bonus to Jim. During the 1:1 meeting with Jim, the manager can inform Jim that the spot bonus has been given to him in appreciation for all the work he's done.

FIG. 12 illustrates another exemplary scenario for recommending actions to the manager. Here, the manager is visiting one of the retail stores that she manages. The rules engine can trigger a rule during the visit to the retail store. As shown in scenario 1200, the rules engine can determine that a rule has been triggered when the manager is nearby the retail store. The location of the manager can be based on the client device that the manager is operating. For example, the GPS location of the client device can represent the location of the manager. When the GPS location of the client device is within a predefined proximity of the retail store, a rule of the rules engine can be triggered. The rules engine can execute the rule and generate an alert when appropriate. In other embodiments, the rules engine can receive a notification from a calendar application that the manager's appointment with the retail store is occurring within a predefined period of time. The rules engine can trigger a rule that for execute based on the received notification.

The rules engine can query other software tools to retrieve contextual information relevant to the manager's visit. The queries can be based on the triggered rule. For example, the triggered rule can specify the software tools that should be queried plus the information that should queried from the software tools. The queried information can be processed and aggregated for presentation to the manager. Here, contextual information such as the frequency in which the manager visits the retail store, the performance review of the retail store, the performance review of the employees working in the retail store, and potential concerns with the retail store can be queries from multiple software tools. A coaching engine can aggregate the queried contextual information present the aggregated information on a client device operated by the manager before the appointment or before the manager enters the retail store. Here, the manager is able to see on her client device the avatar (i.e., profile picture) of each employee working in the retail store along with aggregated information on each employee. The manager can take advantage of this aggregated information as she speaks with the employees in the retail store.

Figure 13:
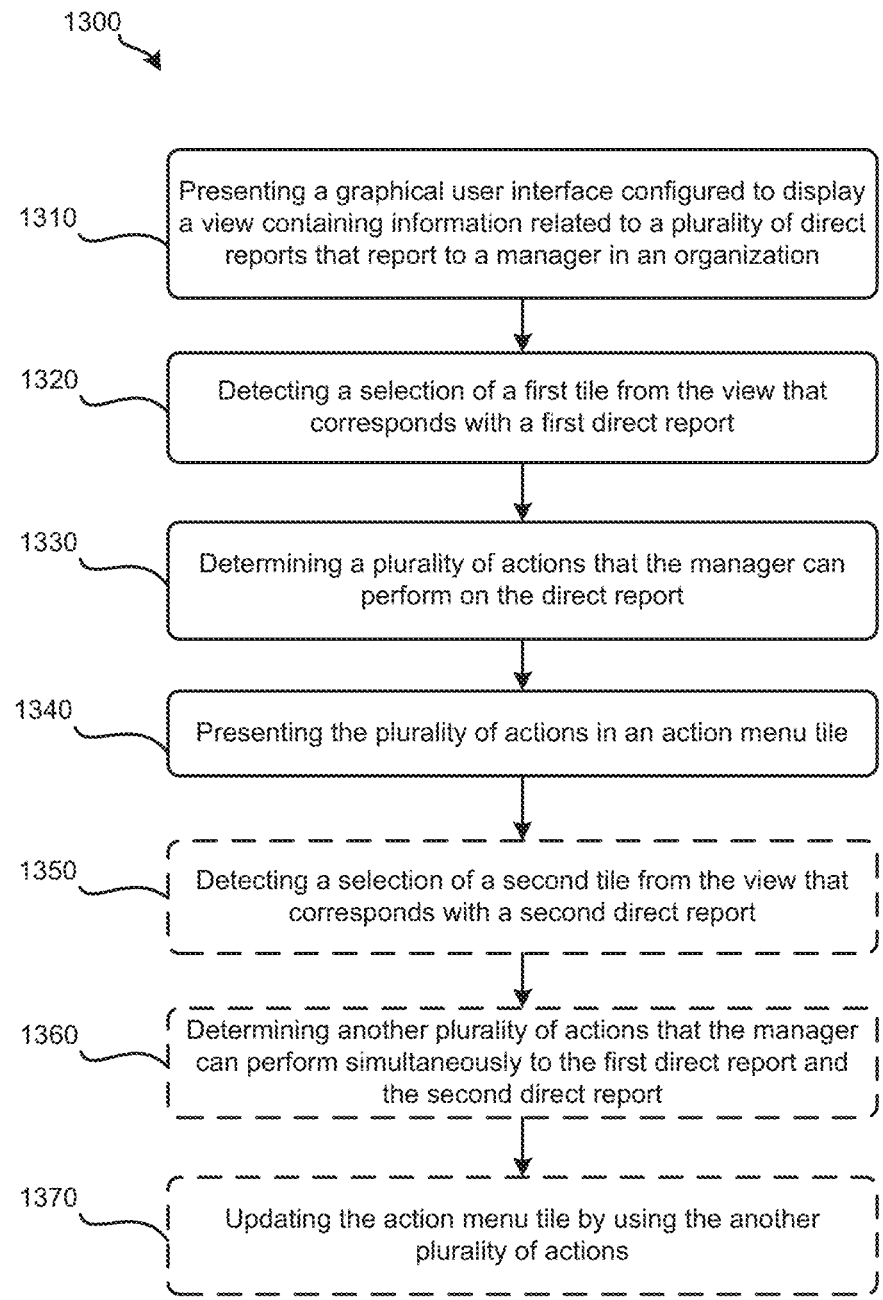
FIG. 13 illustrates a process for presenting a manager cockpit according to one embodiment.

FIG. 13 illustrates a process for presenting a manager cockpit according to one embodiment. Process 1300 can be stored in computer readable code and executed by a processor. For example, process 1300 can be a part of the computer readable code belonging to manager cockpit 110 of FIG. 1. Process 1300 begins by presenting a graphical user interface configured to display a view containing information related to direct reports that report to a manager in an organization. The view can include a plurality of selectable tiles. In one example, each direct report of the manager can be associated with at least selectable tile in the view. In another example, the manager can be associated with at least one selectable tile in the view. The tiles within the view may be actionable where one or more actions can be presented upon selection of a tile.

Process 1300 continues by detecting a selection of a first tile from the view that corresponds with a first direct report. In one example, detecting the selection can include receiving communication from the client device operated by the manager. The communication can be a notification from the client device that a touch gesture on a touch display of the client device has been detected on or near the first tile. Once the selection has been detected, process 1300 can continue by determining a first plurality of actions that the manager can perform on the directed report at 1330. Determining the first plurality of actions can depend on the context of the tile and at least one contextual metric associated with a first direct report represented by the first tile. For example, the fact that the tile is a goal related tile or that the tile is a vacation related tile can affect the first plurality of actions chosen. In some embodiments, the first plurality of actions can include actions identified by the coaching engine to address alerts generated by the rules engine. At 1340, the first plurality of actions can be presented in an action menu tile. In one embodiment, the action menu tile can overlap existing tiles in the view. For example, a headlines tile or an analytics tile can be partially blocked due to the action menu tile.

In some embodiments, process 1300 can optionally continue by detecting a selection of a second tile from the view that corresponds with a second direct report at 1350. Once the second tile is selected, process 1300 can determine a second plurality of actions that the manager can perform simultaneously to the first direct report and the second direct report. This can include identifying one or more actions from the first plurality of actions that can be applied simultaneously to both the first direct report and the second direct report. The second plurality of actions can be used to update the action menu tile so that it includes a new list of actions from the second plurality of actions. In one embodiment, the second plurality of actions is a subset of the first plurality of actions. As a result, actions that are in the first plurality of actions but are not in the second plurality of actions can be removed from the action menu tile. In one embodiment, alerts generated from a software tool that is relevant to the first direct report can be presented on the first tile.

Figure 14:
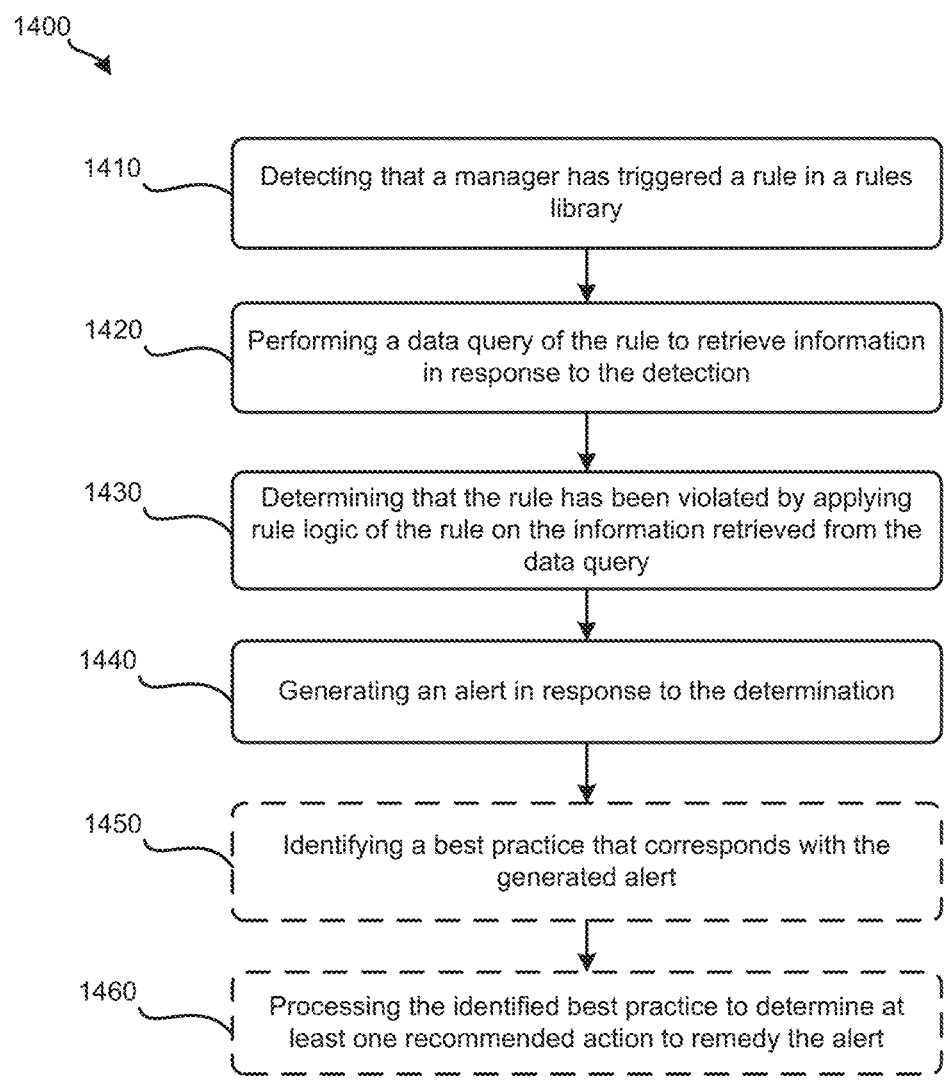
FIG. 14 illustrates a process for providing recommended actions to a manager according to one embodiment.

FIG. 14 illustrates a process for providing recommended actions to a manager according to one embodiment. Process 1400 can be stored in computer readable code and executed by a processor. For example, process 1400 can be a part of the computer readable code belonging to manager cockpit 110 of FIG. 1. Process 1400 begins by detecting that the manager has triggered a rule in a rules library at 1410. The rules library can contain a plurality of rules configured to monitor manager performance. In one embodiment, a rule can include a triggering event for triggering the rule, a data query for requesting data from a remote software tool, and rule logic for analyzing the requested data to determine whether the rule has been violated. In response to the detection, process 1400 can perform a data query of the rule to retrieve information at 1420. When the information is retrieved from the data query, process 1400 determine that the rule has been violated by applying rule logic of the rule on the information retrieved from the data query at 1430. When the rule has been violated, an alert can be generated at 1440.

In some embodiments, process 1400 can continue by optionally identifying a best practice that corresponds with the generated alert at 1450. The best practice can be identified from a best practices library containing a plurality of best practices configured to recommend actions to the manager to improve manager performance. Process 1400 can then optionally continue by processing the identified best practice to determine at least one recommended action to remedy the alert at 1460. Processing the best practice can include performing a data query of the best practice to retrieve additional information and applying remedial logic of the best practice on the retrieved information.

Figure 15:
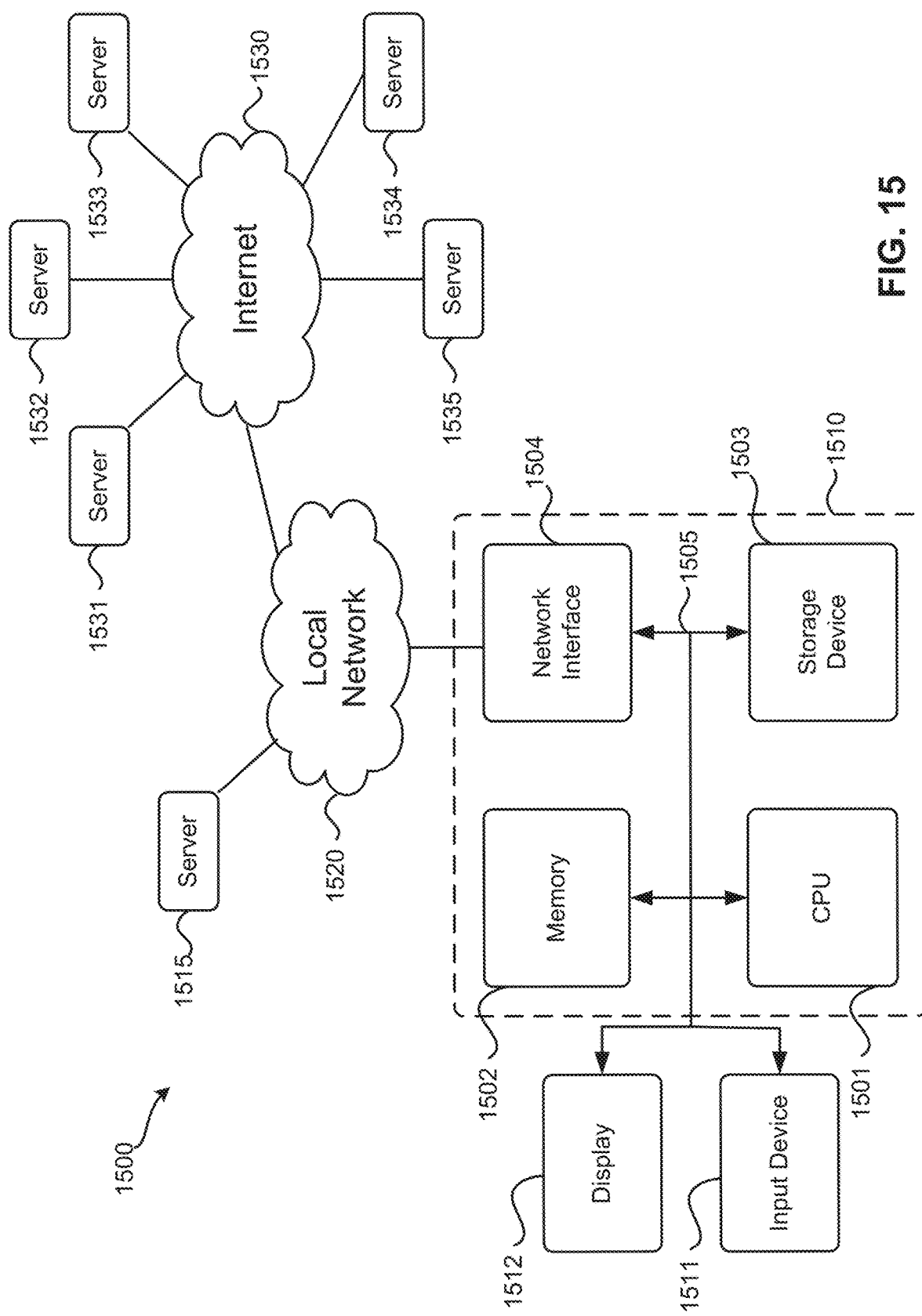
FIG. 15 illustrates an exemplary computer system according to one embodiment.

An exemplary computer system 1500 is illustrated in FIG. 15. Computer system 1510 includes a bus 1505 or other communication mechanism for communicating information, and a processor 1501 coupled with bus 1505 for processing information. Computer system 1510 also includes memory 1502 coupled to bus 1505 for storing information and instructions to be executed by processor 1501, including information and instructions for performing the techniques described above, for example. This memory may also be used for storing variables or other intermediate information during execution of instructions to be executed by processor 1501. Possible implementations of this memory may be, but are not limited to, random access memory (RAM), read only memory (ROM), or both. A storage device 1503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1503 may include source code, binary code, or software files for performing the techniques above, for example. Storage device and memory are both examples of computer readable mediums.

Computer system 1510 may be coupled via bus 1505 to a display 1512, such as a cathode ray tube (CRT) or liquid crystal display (LCD), for displaying information to a computer user. An input device 1511 such as a keyboard and/or mouse is coupled to bus 1505 for communicating information and command selections from the user to processor 1501. The combination of these components allows the user to communicate with the system. In some systems, bus 1505 may be divided into multiple specialized buses.

Computer system 1510 also includes a network interface 1504 coupled with bus 1505. Network interface 1504 may provide two-way data communication between computer system 1510 and the local network 1520. The network interface 1504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 1510 can send and receive information, including messages or other interface actions, through the network interface 1504 across a local network 1520, an Intranet, or the Internet 1530. For a local network, computer system 1510 may communicate with a plurality of other computer machines, such as server 1515. Accordingly, computer system 1510 and server computer systems represented by server 1515 may form a cloud computing network, which may be programmed with processes described herein. In the Internet example, software components or services may reside on multiple different computer systems 1510 or servers 1531-1535 across the network. The processes described above may be implemented on one or more servers, for example. A server 1531 may transmit actions or messages from one component, through Internet 1530, local network 1520, and network interface 1504 to a component on computer system 1510. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
presenting, by a processor, a graphical user interface (GUI) configured to display a plurality of views, wherein each view in the plurality of views is configured to include a menu tile, a views tile, and tiles arranged in a non-hierarchical manner that are associated with direct reports that report to a manager in an organization, the menu tile comprising a first plurality of selectable icons, each selectable icon in the first plurality of selectable icons for switching to a different menu, the views tile comprising a second plurality of selectable icons, each selectable icon in the second plurality of selectable icons for switching to a different view in the plurality of views, the plurality of views comprising:
  a first view containing a first set of information related to each direct report in a plurality of the direct reports that report to the manager in the organization, the first view including a data tile and a plurality of selectable tiles where each direct report in the plurality of direct reports is associated with at least one selectable tile in the first view, the data tile for presenting data relevant to the manager, and
  a second view containing a second, different set of information related to each direct report in a portion of the plurality of direct reports and no information for remaining direct reports in the plurality of direct reports, the second view including a set of selectable tiles where each direct report in the portion of the plurality of direct reports is associated with at least one selectable tile in the second view;

determining, by the processor, a number of direct reports in the plurality of direct reports;

upon determining that the number of direct reports is greater than a predefined number of direct reports, presenting, by the processor, the first view in the GUI;

upon determining that the number of direct reports is not greater than the predefined number of direct reports, presenting, by the processor, the second view in the GUI;

detecting, by the processor, a selection of a first tile from the first view that corresponds with a first direct report;

determining, by the processor, a first plurality of actions that the manager can perform on the first direct report;

presenting, by the processor, the first plurality of actions in an action menu tile in the first view by overlaying the action menu tile over the data tile; and upon detecting a selection of an action in the first plurality of actions from the action menu tile in the first view, removing, by the processor, the action menu tile to reveal the data tile.

2. The computer-implemented method of claim 1 further comprising:
  detecting, by the processor, a selection of a second tile from the first view that corresponds with a second direct report;
  determining, by the processor, a second plurality of actions that the manager can perform simultaneously to the first direct report and the second direct report; and
  updating, by the processor, the action menu tile by using the second plurality of actions.

3. The computer-implemented method of claim 1, wherein each tile in the set of selectable tiles of the second view comprises a set of sub-tiles, wherein different sub-tiles in the set of sub-tiles of each tile in the set of selectable tiles of the second view are configured to present different metrics associated with the direct report with which the tile is associated that are not included in the first view.

4. The computer-implemented method of claim 1, wherein the first plurality of actions are determined according to a context of the tile and at least one contextual metric associated with the first direct report.

5. The computer-implemented method of claim 1 further comprising:
  detecting, by the processor, another selection of an action from the first plurality of actions; and
  transmitting, by the processor, an instruction based on the selected action to a software tool from a plurality of software tools that is configured to perform the selected action.

6. The computer-implemented method of claim 1 further comprising:
  receiving, by the processor, one or more alerts from a plurality of software tools that are relevant to the first direct report; and
  presenting, by the processor, an icon representative of the one or more alerts on the first tile.

7. The computer-implemented method of claim 6, wherein determining the first plurality of actions comprises:
  identifying, by the processor, an action that can resolve an alert from the one or more alerts; and
  including, by the processor, the action in the first plurality of actions.

8. A non-transitory computer readable storage medium storing one or more programs, the one or more programs comprising instructions for:
  presenting a graphical user interface (GUI) configured to display a plurality of views, wherein each view in the plurality of views is configured to include a menu tile, a views tile, and tiles arranged in a non-hierarchical manner that are associated with direct reports that report to a manager in an organization, the menu tile comprising a first plurality of selectable icons, each selectable icon in the first plurality of selectable icons for switching to a different menu, the views tile comprising a second plurality of selectable icons, each selectable icon in the second plurality of selectable icons for switching to a different view in the plurality of views, the plurality of views comprising:
    a first view containing a first set of information related to each direct report in a plurality of the direct reports that report to the manager in the organization, the first view including a data tile and a plurality of selectable tiles where each direct report in the plurality of direct reports is associated with at least one selectable tile in the first view, the data tile for presenting data relevant to the manager, and
    a second view containing a second, different set of information related to each direct report in a portion of the plurality of direct reports and no information for remaining direct reports in the plurality of direct reports, the second view including a set of selectable tiles where each direct report in the portion of the plurality of direct reports is associated with at least one selectable tile in the second view;

determining a number of direct reports in the plurality of direct reports;

upon determining that the number of direct reports is greater than a predefined number of direct reports, presenting the first view in the GUI;

upon determining that the number of direct reports is not greater than the predefined number of direct reports, presenting the second view in the GUI;

detecting a selection of a first tile from the first view that corresponds with a first direct report;

determining a first plurality of actions that the manager can perform on the first direct report;

presenting the first plurality of actions in an action menu tile in the first view by overlaying the action menu tile over the data tile; and upon detecting a selection of an action in the first plurality of actions from the action menu tile in the first view, removing, by the processor, the action menu tile to reveal the data tile.

9. The non-transitory computer readable storage medium of claim 8, wherein the one or more programs further comprises instructions for:
  detecting a selection of a second tile from the first view that corresponds with a second direct report;
  determining a second plurality of actions that the manager can perform simultaneously to the first direct report and the second direct report; and
  updating the action menu tile by using the second plurality of actions.

10. The non-transitory computer readable storage medium of claim 8, wherein each tile in the set of selectable tiles of the second view comprises a set of sub-tiles, wherein different sub-tiles in the set of sub-tiles of each tile in the set of selectable tiles of the second view are configured to present different metrics associated with the direct report with which the tile is associated that are not included in the first view.

11. The non-transitory computer readable storage medium of claim 8, wherein the first plurality of actions are determined according to a context of the tile and at least one contextual metric associated with the first direct report.

12. The non-transitory computer readable storage medium of claim 8, wherein the one or more programs further comprises instructions for:
  detecting another selection of an action from the first plurality of actions; and
  transmitting an instruction based on the selected action to a software tool from a plurality of software tools that is configured to perform the selected action.

13. The non-transitory computer readable storage medium of claim 8, wherein the one or more programs further comprises instructions for:
  receiving one or more alerts from a plurality of software tools that are relevant to the first direct report; and
  presenting an icon representative of the one or more alerts on the first tile.

14. The non-transitory computer readable storage medium of claim 13, wherein determining the first plurality of actions comprises:
  identifying an action that can resolve an alert from the one or more alerts; and
  including the action in the first plurality of actions.

15. A computer implemented system comprising:
  one or more computer processors; and
  a non-transitory computer-readable storage medium comprising instructions, that when executed, control the one or more computer processors to be configured for:
  presenting a graphical user interface (GUI) configured to display a plurality of views, wherein each view in the plurality of views is configured to include a menu tile, a views tile, and tiles arranged in a non-hierarchical manner that are associated with direct reports that report to a manager in an organization, the menu tile comprising a first plurality of selectable icons, each selectable icon in the first plurality of selectable icons for switching to a different menu, the views tile comprising a second plurality of selectable icons, each selectable icon in the second plurality of selectable icons for switching to a different view in the plurality of views,
  the plurality of views comprising:
    a first view containing a first set of information related to each direct report in a plurality of the direct reports that report to the manager in the organization, the first view including a data tile and a plurality of selectable tiles where each direct report in the plurality of direct reports is associated with at least one selectable tile in the first view, the data tile for presenting data relevant to the manager, and
    a second view containing a second, different set of information related to each direct report in a portion of the plurality of direct reports and no information for remaining direct reports in the plurality of direct reports, the second view including a set of selectable tiles where each direct report in the portion of the plurality of direct reports is associated with at least one selectable tile in the second view;
  determining a number of direct reports in the plurality of direct reports;
  upon determining that the number of direct reports is greater than a predefined number of direct reports, presenting the first view in the GUI;
  upon determining that the number of direct reports is not greater than the predefined number of direct reports, presenting the second view in the GUI;
  detecting a selection of a first tile from the first view that corresponds with a first direct report;
  determining a first plurality of actions that the manager can perform on the first direct report;
  presenting the first plurality of actions in an action menu tile in the first view by overlaying the action menu tile over the data tile; and
  upon detecting a selection of an action in the first plurality of actions from the action menu tile in the first view, removing, by the processor, the action menu tile to reveal the data tile.

16. The computer implemented system of claim 15, wherein the instructions control the one or more computer processors to be further configured for:
  detecting a selection of a second tile from the first view that corresponds with a second direct report;
  determining a second plurality of actions that the manager can perform simultaneously to the first direct report and the second direct report; and
  updating the action menu tile by using the second plurality of actions.

17. The computer implemented system of claim 15, wherein the first plurality of actions are determined according to a context of the tile and at least one contextual metric associated with the first direct report.

18. The computer implemented system of claim 15, wherein the instructions control the one or more computer processors to be further configured for:
  detecting another selection of an action from the first plurality of actions; and
  transmitting an instruction based on the selected action to a software tool from a plurality of software tools that is configured to perform the selected action.

19. The computer implemented system of claim 15, wherein the instructions control the one or more computer processors to be further configured for:
  receiving one or more alerts from a plurality of software tools that are relevant to the first direct report; and
  presenting an icon representative of the one or more alerts on the first tile.

20. The computer implemented system of claim 19, wherein determining the first plurality of actions comprises:

identifying an action that can resolve an alert from the one or more alerts; and including the action in the first plurality of actions.

* * * * *